US009589270B2

(12) United States Patent
Weiss et al.

(10) Patent No.: US 9,589,270 B2
(45) Date of Patent: Mar. 7, 2017

(54) ELECTRONICALLY CAPTURING CONSUMER LOCATION DATA FOR ANALYZING CONSUMER BEHAVIOR

(75) Inventors: Eric H. Weiss, Somerville, MA (US); Thaddeus R. F. Fulford-Jones, Somerville, MA (US); Andrew Volpe, Boston, MA (US)

(73) Assignee: Service Management Group, Inc., Kansas City, MO (US)

( * ) Notice: Subject to any disclaimer, the term of this patent is extended or adjusted under 35 U.S.C. 154(b) by 308 days.

(21) Appl. No.: 12/910,280

(22) Filed: Oct. 22, 2010

(65) Prior Publication Data
US 2011/0099047 A1    Apr. 28, 2011

Related U.S. Application Data

(60) Provisional application No. 61/254,328, filed on Oct. 23, 2009, provisional application No. 61/309,751, filed on Mar. 2, 2010.

(51) Int. Cl.
| | |
|---|---|
| *G06Q 10/00* | (2012.01) |
| *G06Q 30/02* | (2012.01) |
| *G06Q 30/00* | (2012.01) |
| *H04W 4/02*  | (2009.01) |

(52) U.S. Cl.
CPC .............. *G06Q 30/02* (2013.01); *G06Q 10/00* (2013.01); *G06Q 30/00* (2013.01); *G06Q 30/0202* (2013.01); *G06Q 30/0205* (2013.01); *H04W 4/028* (2013.01)

(58) Field of Classification Search
CPC ........ G06F 17/30256; G06F 17/30781; G06K 9/00711; G06Q 10/00; G06Q 30/00; G06Q 30/0202; G06Q 30/0205; H04W 4/028

USPC ............................. 705/7.29, 7.34; 455/404.2
See application file for complete search history.

(56) References Cited

U.S. PATENT DOCUMENTS

| | | |
|---|---|---|
| 5,557,524 A  | 9/1996  | Maki |
| 6,098,048 A  | 8/2000  | Dashefsky et al. |
| 6,509,830 B1 | 1/2003  | Elliott |
| 6,609,064 B1 | 8/2003  | Dean |
| 6,647,269 B2 | 11/2003 | Hendrey et al. |
| 6,970,131 B2 | 11/2005 | Percy et al. |
| 6,975,941 B1 | 12/2005 | Lau et al. |
| 7,176,834 B2 | 2/2007  | Percy et al. |

(Continued)

OTHER PUBLICATIONS

Location-Based Services: Models for Strategy Development in M-Commerce—by Unni et al. 2003.*

(Continued)

*Primary Examiner* — Jonathan G Sterrett
(74) *Attorney, Agent, or Firm* — Andrew J. Tibbetts

(57) ABSTRACT

In embodiments, methods and systems for electronically capturing consumer location data for consumer behavior analysis may be provided. The location data may be gathered for one or more consumers from any suitable source. In some cases, the location data may be gathered using electronic devices associated with consumers, such as mobile phones. The gathered data may be analyzed to determine behavior patterns or other characteristics of the one or more consumers. Further, inferences or predictions about consumers may be derived based on the characteristics. The inferences and predictions may be the basis of consumer analytics supplied to a business or other entity.

42 Claims, 10 Drawing Sheets

(56) References Cited

U.S. PATENT DOCUMENTS

| | | |
|---|---|---|
| 7,215,280 B1 | 5/2007 | Percy et al. |
| 7,240,834 B2 | 7/2007 | Kato et al. |
| 7,305,245 B2 | 12/2007 | Alizadeh-Shabdiz et al. |
| 7,408,502 B2 | 8/2008 | Percy et al. |
| 7,515,578 B2 | 4/2009 | Alizadeh-Shabdiz et al. |
| 7,586,439 B2 | 9/2009 | Percy et al. |
| 7,589,628 B1 | 9/2009 | Brady, Jr. |
| 7,769,633 B2 | 8/2010 | Jokinen et al. |
| 8,073,460 B1 | 12/2011 | Scofield et al. |
| 2002/0082921 A1 | 6/2002 | Rankin |
| 2002/0111154 A1 | 8/2002 | Eldering et al. |
| 2002/0111172 A1* | 8/2002 | DeWolf et al. ............... 455/456 |
| 2003/0033195 A1 | 2/2003 | Bruce et al. |
| 2003/0146871 A1 | 8/2003 | Karr et al. |
| 2003/0177058 A1 | 9/2003 | Needham |
| 2005/0177449 A1 | 8/2005 | Temares et al. |
| 2005/0222829 A1* | 10/2005 | Dumas .............................. 703/2 |
| 2005/0243784 A1* | 11/2005 | Fitzgerald et al. ........... 370/338 |
| 2006/0111961 A1 | 5/2006 | McQuivey |
| 2006/0174329 A1* | 8/2006 | Dublish ............................ 726/4 |
| 2007/0185768 A1 | 8/2007 | Vengroff et al. |
| 2008/0125959 A1* | 5/2008 | Doherty et al. ............... 701/200 |
| 2008/0246657 A1* | 10/2008 | Percy et al. ............. 342/357.07 |
| 2008/0248815 A1* | 10/2008 | Busch ........................ 455/456.5 |
| 2009/0064173 A1 | 3/2009 | Goldspink et al. |
| 2009/0076888 A1 | 3/2009 | Oster et al. |
| 2009/0083128 A1 | 3/2009 | Siegel |
| 2009/0106085 A1 | 4/2009 | Raimbeault |
| 2009/0112683 A1 | 4/2009 | Hamilton et al. |
| 2009/0125396 A1 | 5/2009 | Otto et al. |
| 2009/0132469 A1 | 5/2009 | White et al. |
| 2009/0171939 A1 | 7/2009 | Athsani et al. |
| 2009/0197582 A1 | 8/2009 | Lewis et al. |
| 2009/0199107 A1 | 8/2009 | Lewis et al. |
| 2009/0248288 A1 | 10/2009 | Bell et al. |
| 2009/0298514 A1 | 12/2009 | Ullah |
| 2010/0004997 A1 | 1/2010 | Mehta et al. |
| 2010/0131443 A1 | 5/2010 | Agarwal et al. |
| 2010/0262449 A1 | 10/2010 | Monteforte et al. |
| 2010/0332315 A1 | 12/2010 | Kamar et al. |
| 2011/0022424 A1 | 1/2011 | Vonderheide |
| 2011/0029370 A1 | 2/2011 | Roeding et al. |
| 2011/0099047 A1* | 4/2011 | Weiss et al. ................. 705/7.34 |
| 2011/0231483 A1 | 9/2011 | Derraugh et al. |

OTHER PUBLICATIONS

Mobile landscapes: using location data from cell phones for urban analysis C Ratti, D Frenchman, RM Pulselli . . . —. . . and Planning B: . . . , 2006—epb.sagepub.com.*

Developing GIS-supported location-based services K Virrantaus, J Markkula, A Garmash . . . —. . . Proceedings of the . . . , 2001—ieeexplore.ieee.org.*

Location-based services for elderly and disabled people A Marco, R Casas, J Falco, H Gracia, JI Artigas . . . —Computer . . . , 2008—Elsevier.*

Final Office Action from U.S. Appl. No. 13/472,294 dated Mar. 15, 2013.

Final Office Action from U.S. Appl. No. 13/472,320 dated Mar. 29, 2013.

Non-Final Office Action from U.S. Appl. No. 12/910,311 dated May 24, 2013.

International Search Report and Written Opinion mailed Apr. 30, 2015 for International Patent Application No. PCT/US2010/053700.

International Report on Patentability issued Jun. 2, 2015 for International Patent Application No. PCT/US2010/053700.

U.S. Appl. No. 13/472,294, filed May 15, 2012, Weiss et al.
U.S. Appl. No. 13/472,320, filed May 15, 2012, Weiss et al.
U.S. Appl. No. 13/535,108, filed Jun. 27, 2012, Volpe et al.
U.S. Appl. No. 13/535,130, filed Jun. 27, 2012, Volpe et al.
U.S. Appl. No. 13/535,150, filed Jun. 27, 2012, Volpe et al.

* cited by examiner

CVS REGULAR

CELTICS FAN

WITHIN TWO MILES OF A WALGREENS 80% OF THE TIME

RESIDENT OF SOMERVILLE, MA   WAL-MART CUSTOMER

TRIPS TO THE MOVIES ON FRIDAYS, GROCERY SHOPPING ON WEDNESDAYS

WORKPLACE IN DOWNTOWN BOSTON

MCDONALDS'S PATRON   85 % PREDICATBLE ACTIVITY PATTERNS

FITNESS-INTERESTED INDIVIDUAL

ELECTRONICALLY CAPTURING CONSUMER LOCATION DATA FOR ANALYZING CONSUMER BEHAVIOR

RELATED APPLICATIONS

This application claims priority under 35 U.S.C. §119(e) to U.S. Provisional Application Ser. No. 61/254,328, entitled "Method and system for consumer behavior analysis using electronically captured consumer location data," filed on Oct. 23, 2009, and to U.S. Provisional Application Ser. No. 61/309,751, entitled "Method and system for consumer behavior analysis using electronically-captured consumer location data," filed on Mar. 2, 2010, both of which are herein incorporated by reference in their entirety.

BACKGROUND

1. Technical Field

The invention relates generally to analyzing consumer characteristics and more specifically to making inferences and predictions about consumer behavior based on automatically collected consumer location data.

2. Discussion of Related Art

Businesses can often benefit from knowledge about the behavior of their customers or prospective customers. For example, a business may offer certain products or undertake a marketing strategy based on its beliefs regarding who its customers are. If these beliefs are inaccurate, though, the business' efforts may be misdirected and the business may fail to maintain old customers or attract new customers.

Efforts have been previously made at collecting information about consumers who may be customers and prospective customers of a business. In some such techniques, a researcher may ask consumers about their identities, preferences or behaviors using direct questioning. These questions may be designed to solicit particular information about consumers, such as regions in which a business' customers live, a socioeconomic grouping of consumers, how often the consumers shop at the business, factors influencing purchasing decisions, and their consuming preferences. Written or oral questionnaires, one-on-one interviews, brief point-of-sale questions at the business, focus groups, and telephone or online surveys are examples of ways in which information about consumers can be collected using direct questioning.

This same information may be voluntarily provided by consumers when the consumers register for a service. This may be the case when consumers are registering for discount programs or for services offered commercially by the business. Thus, when a consumer subscribes to services offered by the business, direct questions may solicit information that may be used to acquire information about the individual consumer and for the general class of that business' consumers. The acquired information may then be analyzed to determine information useful to the business.

SUMMARY

In one embodiment, there is provided a method for obtaining data regarding locations of a plurality of consumers. The method comprises, for each of the plurality of consumers, the act of operating at least one programmed processor to perform a set of acts, where the at least one programmed processor is programmed with executable instructions identifying the set of acts. The set of acts comprises assigning, for the consumer, a time interval between attempts to obtain location data for the consumer and, upon expiration of the time interval, obtaining location data for a current location of the consumer, comparing the location data to at least one location for at least one known setting, and adjusting the time interval based at least in part on a proximity of the consumer to a known setting. The set of acts further comprises assigning the adjusted time interval for the consumer and repeating the act of obtaining and the act of comparing.

In another embodiment, there is provided a method for obtaining location data regarding current locations of at least one consumer. The method comprises operating at least one programmed processor to perform a set of acts, where the at least one programmed processor is programmed with executable instructions identifying the set of acts. The set of acts comprises transmitting requests to obtain location data for each of a plurality of consumers to an operator of a wireless wide area network providing telecommunications services to the at least one consumer. The wireless wide area network comprises at least one base station and at least one telecommunications device, and each of the at least one telecommunications device are associated with a consumer of the at least one consumer. The set of acts further comprises producing, based at least in part on received location data for the plurality of consumers, inferences and/or predictions relating to the consumers.

In a further embodiment, there is provided at least one storage medium encoded with computer-executable instructions that, when executed by a computer, cause the computer to perform a method for performing consumer analytics. The method comprises, for each consumer of a plurality of consumers, obtaining location data for a current location of the consumer and comparing the location data to at least one location for at least one known setting to determine a setting corresponding to the location data. The method further comprises producing, based at least in part on location data for the plurality of consumers, inferences and/or predictions relating to the plurality of consumers.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
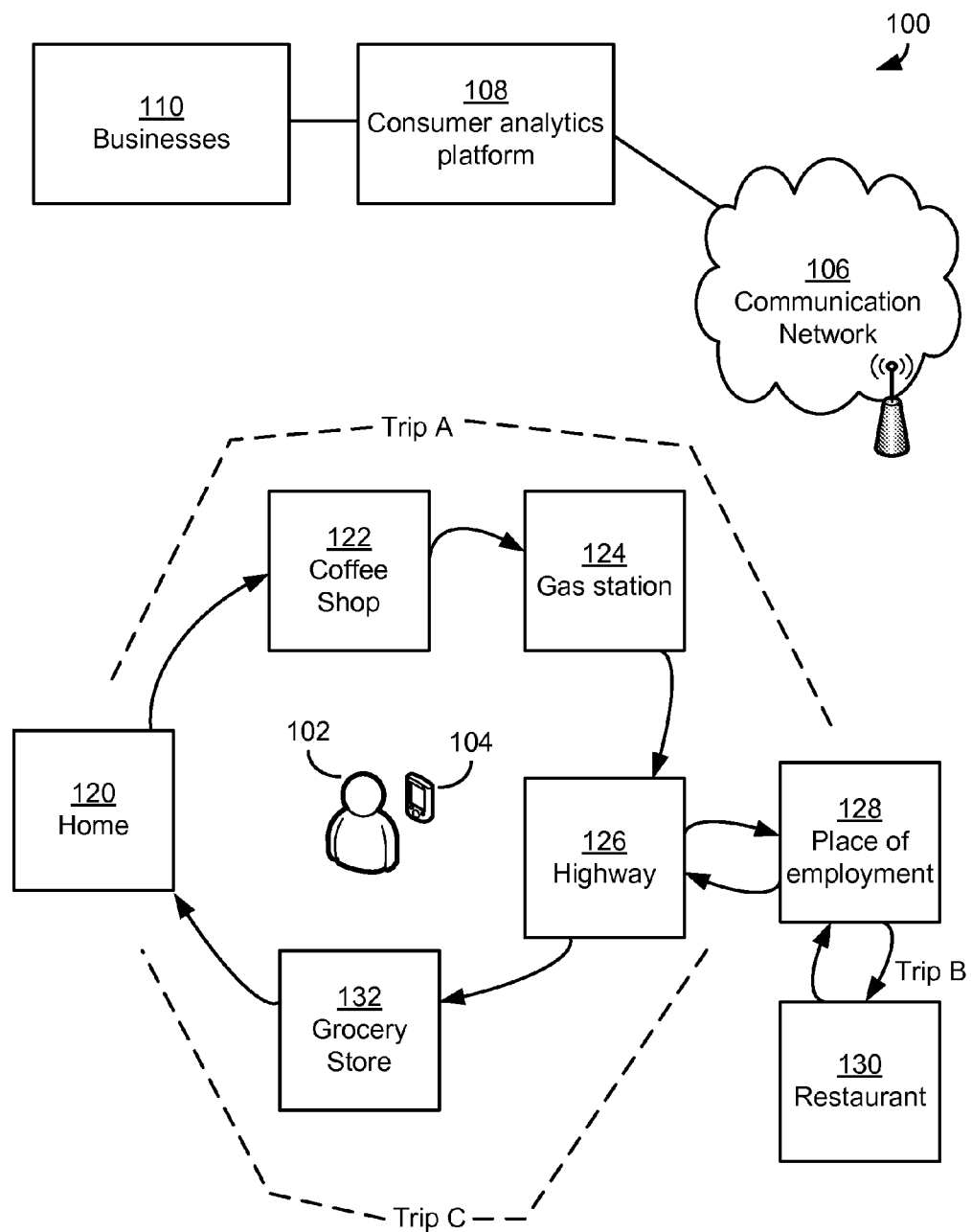
FIG. 1 illustrates one exemplary environment in which embodiments may operate.

Applicants have recognized and appreciated that there are various disadvantages associated with conventional techniques for determining consumer characteristics, including consumer behavior. Asking a customer to answer a series of written or oral questions could provide inaccurate or incomplete information. Inferences from this data likewise may be inaccurate or incomplete. For example, a customer may accidentally underestimate the number of times the customer visits a business or an amount of time spent at each visit to the business. Or, when asked about a marketing campaign, the customer may misremember about having seen a billboard or other advertisement. Moreover, there may be a high cost or undesirable delay associated with designing and conducting a survey to generate appropriate data.

Applicants have further recognized and appreciated that automatically-collected consumer location information can lead to more accurate or more complete consumer analytics. Such automated collection could be performed with the permission of individual consumers, but without requiring any actions be taken by the individual consumers. In some embodiments, information about consumers may help businesses make commercial decisions.

Though, location data collected and analysis performed on that data may be useful in other environments. Techniques as described herein could also provide information for non-commercial organizations about people with which the organizations interact. For example, analysis of location information could provide information to non-profit organizations about donors, to politicians about voters, to governments about citizens, or any other suitable type of organization and a consumer related to that organization. It should be appreciated that, as used herein, the term "consumer" is a generic term for a person who interacts with an organization or who may interact with an organization, and does not imply, by itself, a commercial relationship between the consumer and the organization.

Regardless of the purpose for which data is being analyzed, consumers who have opted to participate in a system that gathers data for determining consumer characteristics may carry with them portable electronic devices that have location-determining capabilities. The determined consumer location, from time-to-time, may be communicated to a consumer analytics platform for analysis. Data about a location of each consumer can be occasionally collected for each consumer as the consumers move while going to work, doing errands, going to social activities, etc. In some embodiments, a consumer analytics platform may obtain location data for a consumer using the devices at time intervals determined on a per-consumer basis. The platform may dynamically adjust the time intervals based on various factors, including a consumer's current location, a current time, and a history of locations visited by a consumer. The intervals between acquiring location information for any consumer may be selected to provide relevant information without requiring excessive power usage by the portable electronic device, which can quickly drain a battery of the device and may deter consumers from agreeing to participate in the system.

The location data that is obtained may be obtained from any suitable source and in any suitable form. As an example, the data may specify geographic coordinates for a consumer's location and a time at which that location data was obtained. In some embodiments, the portable electronic device may be a cellular telephone or may include cellular telephone capabilities, and the data may be acquired through the cell phone network. Such data may be acquired using known interfaces to the cellular telephone system, which may generate data based in whole or in part on cell tower locations relative to the portable electronic device. Such a determination may employ triangulation techniques and may use technology sometimes called assisted GPS. Using the cellular telephone network may reduce the power drain on the portable electronic device, because such techniques as assisted GPS use less power than, for example, GPS. In addition, using a cellular device, or other device that serves a purpose other than data collection, as the source of location data may increase the reliability of consumer data by increasing the likelihood that a consumer will carry the portable electronic device.

Regardless of the specific source or format of the location data, the location data received from multiple consumers may be received and stored for later analysis. When analyzed, this location data could reveal characteristics of consumers. These characteristics may include behaviors, such as the stores at which the consumers shop, how long they spend at each store, and which stores they visit in one overall shopping trip. In addition to revealing commercial behaviors, such an analysis may reveal recreational behaviors. Additionally or alternatively, an analysis of this location information could reveal characteristics such as consumer preferences. Additionally or alternatively, an analysis of this location information could reveal identity characteristics, such as their home and work locations and roads on which they frequently travel. This information, based on collected factual information and analysis, could be more reliable or more readily obtained than information derived from consumer's answers to questions.

As an example of behavior characteristics that may be derived, information about locations visited and trips taken by consumers may be derived. This information may include determining that a consumer visited a point of interest for a particular study, such as a store owned by a sponsor of the study or a competitor of that sponsor. Alternatively or additionally, the analysis may reveal a set of all points of interest visited by the consumer, and patterns in visits to points of interest by the consumer. Paths that are sets of points of interest visited together by a consumer, such as part of a single trip, and the route between the points of interest can also be determined from the location data, as can patterns in paths. For example, the platform may identify sets of two or more points of interest that the consumer often visits together in one path.

As an example of preference characteristics that may be derived, location data, defining geographic locations, may be combined with place information, indicating activities that occur at specific geographic locations at times when the consumer is present at the location to yield information about characteristics of a consumer.

The identity characteristic information may include information about types of organizations the consumer visits, which may reveal interests of the consumer. As a specific example, if a consumer is detected, based on the location data, to often visit professional sports venues and sports-themed bars, the consumer analytics platform may identify the consumer as a sports fan. As another example, if a consumer is detected to often visit gyms, public sports fields, professional sports venues, and sports-themed bars, the platform may identify the consumer as a person with an "active" lifestyle. Though, preference characteristics may be derived in a more fine-grained way. By correlating location data, including times, with specific events at specific locations at times when a consumer is present, a more accurate determination of a preference may be made. For example, by detecting that a consumer is at a sports venue when a hockey game is on-going, the consumer may be classified as a hockey fan.

Such information collected for multiple consumers may be used as the basis for inferences and predictions about groups of consumers, which may be provided to an organization who sponsored a study performed with the consumer analytics platform. In some cases, when characteristics are generated through analysis of location data for consumers, the characteristics may be stored in profiles for each consumer. Characteristics for each consumer that are stored in the profiles may be reviewed to yield inferences and predictions about consumers with respect to the organization sponsoring the study. In some cases, the inferences and predictions with respect to the organization may include inferred or predicted characteristics of the consumers, such as behaviors of groups of consumers with respect to the organization or related organizations. In other cases, the inferences and predictions could be information about potential outcomes of business decisions, such as outcomes related to each of various proposed scenarios. For example, information could be provided, based on the inferences or predictions, that indicates whether and how consumers may react to potential business decisions or what consumers may do given particular conditions. Any suitable information may be generated as an inference or prediction, based on profile data for multiple consumers.

Those inferences or predictions could aid the organization make decisions such as which products to sell, marketing campaigns to undertake, locations of new store sites, or other commercial decisions. For example, the consumer analysis system may format the inferences and predictions to reveal to a business who its competitors are. Competitors may be revealed, for example, by showing which businesses are visited by consumers with characteristics comparable to those of consumers who visit stores run by the business. Conversely, the consumer analytics platform may format the inferences and predictions to reveal to a business what businesses are complementary to its business, by showing which businesses consumers with comparable characteristics visit in conjunction with the business.

Some inferences and predictions generated by the consumer analytics platform may reveal that consumers that have an existing relationship with an organization often have existing relationships with other organizations, that the consumers live or travel within a certain area, or that some portion of the consumers have a certain preference. The organization may also learn that consumers that do not have an existing relationship with the organization have certain characteristics, such as living in a certain area or having certain interests. This information could then be used by organizations in any suitable manner. For example, an organization could make strategic decisions based on the information. Store siting and marketing campaigns can be influenced by consumer characteristic information, as stores may be located near consumers' homes or travel routes and marketing campaigns may be directed at known interests of consumers.

As another example, inferences generated by the consumer analysis system may reveal advertising effectiveness. By recognizing that a consumer has been exposed to an advertisement based on location, the system may then analyze captured location data to determine whether a consumer has changed behavior after having been exposed to the advertisement. Such a change may be the basis of an inference that the advertisement was effective.

As yet a further example, inferences and predictions may reveal the context in which consumers do or do not visit a retail location. For example, by identifying from location data a consumer's home and office, a business can determine which types of consumers typically stop to purchase a particular type of product when leaving home, when leaving the office or in some other context. Such information, for example, may inform a business of promotions or advertisements that may entice consumers, in a context in which they are likely to purchase a particular product to visit a store operated by that business.

The embodiments described above are merely illustrative of the various ways in which embodiments may operate. Further examples of ways in which a consumer analytics platform can be implemented in accordance with principles described herein are provided below. For ease of description, in the exemplary embodiments below, each consumer is a customer or potential customer and each organization is a business. As discussed above, though, embodiments are not so limited. Rather, embodiments may identify characteristic information for any suitable group of people having or potentially having any type of commercial or non-commercial affiliation with any suitable organization. For ease of explanation, however, any such group of people will be referred to herein as a group of "consumers."

In some embodiments described below, electronically-derived consumer location data is analyzed to determine information relating to characteristics of a consumer, which may include information about consumer behavior. Consumer behaviors include behaviors engaged in by consumers. Such consumer behaviors may include (1) retail-relevant activities and (2) lifestyle-relevant activities. Retail-relevant activities may include behaviors relating to commercial activities engaged in by a consumer. Commercial activities include activities in which a monetary transaction takes place or could take place, including visits to any location where a consumer could purchase products or services. Lifestyle-relevant activities may include behaviors related to a consumer's daily life. Lifestyle behavior includes information about a consumer's work life and home life and regular routine, including their recreational behaviors. Lifestyle activities include, but are not limited to, visits to and time spent at a consumer's residence and place of employment; travel patterns and habits, including commuting patterns and air travel; and visits to outdoor recreation destinations, nightlife locations, sports and entertainment venues, museums, amusement parks, and tourist destinations.

More particularly, using systems and techniques operating in accordance with principles described herein, characteristics of consumers may be determined through analysis. Characteristics of a consumer may relate to any suitable attributes, such as an identity of a consumer, behavior of a consumer, and preferences of a consumer. Identity characteristics may include demographic and socioeconomic attributes of a consumer, including where the consumer lives and works. Behavior characteristics include any suitable information on behaviors of the consumer, which may include both retail-relevant behaviors and lifestyle-relevant behaviors. As discussed above, retail-relevant behaviors include behaviors relating to commercial activities engaged in by a consumer and lifestyle-relevant behavior includes information about a consumer's work life and home life and regular routine, including their recreational behaviors. Characteristics of behaviors may include information about activities in which a consumer does or does not participate or a manner in which the consumer participates in an activity. Information on a manner in which the consumer participates in an activity includes information on a frequency or periodicity of the consumer's participation in the activity. Additionally, guesses as to whether a consumer is likely to participate in an activity may be inferred or predicted as part of behavior characteristics. Preference characteristics may include information on preferences of the consumer for particular types of products/services or particular products/services, including brand loyalties of a consumer. For each of these characteristics, a strength of the characteristic and/or a likelihood that the characteristic has been correctly determined may be identified.

Illustrative Context

FIG. 1 illustrates one exemplary environment in which embodiments may operate to detect location data for consumers and, by analyzing that location data, determine characteristics of those consumers. The example of FIG. 1 is described in connection with one consumer, but embodiments may operate with any number of consumers.

In the environment 100 of FIG. 1, a consumer 102, who has decided to participate in an analysis program carried out by a consumer analytics platform 108, changes location while going to work, going home, going to school, running errands, or moving from any other place to place. In the specific example of FIG. 1, the consumer 102 visits a coffee shop 122, gas station 124, workplace 128, restaurant 130, and grocery store 132 during a day. The consumer analytics platform 108 monitors movements of the consumer 102 and, by analyzing locations the consumer 102 visits, determines characteristics of the consumer 102 and produces inferences and predictions based on the characteristics.

The consumer 102 is associated with a device 104 that can be used to obtain location information for the consumer 102 as the consumer 102 moves. The consumer 102 may move with the device 104, as the consumer 102 may carry the device 104 or the device 104 may be embedded in a car, piece of clothing, or baggage carried by the consumer 102. In some cases, the device 104 may be useful only in determining a location of the consumer 102, while in other cases the device 104 may have other functionality. For example, the device 104 may be a mobile telephone with location-identifying capabilities, such as a cellular telephone with a built-in Global Positioning System (GPS) or Assisted GPS (AGPS) receiver that the cellular telephone can use to determine its current location. The device 104 may be able to communicate with a network 106, which may be any suitable communication network, including a wireless wide-area network (WWAN). In cases where the device 104 is a cellular telephone, the network 106 may be a cellular network.

The environment 100 may also include a consumer analytics platform 108 that is able to obtain location information for the consumer 102, analyze the location information to determine characteristics of the consumer 102, and produce inferences and predictions based on the determined characteristics. The consumer analytics platform 108 may obtain location information for a consumer 102 from the device 104. In some cases, the consumer analytics platform 108 may request the location information from the network 106 and, in turn, the network 106 may obtain location data from the device 104. In some embodiments, the consumer analytics platform 108 may request the location data at intervals that the location analysis tool 108 can adjust based on various factors, including a current location of the consumer 102.

The consumer 102 may move from place to place during activities engaged in by the consumer. As the consumer 102 moves, the device 104 associated with the consumer 102 may determine a location for the consumer 102 continuously or occasionally. This location information may then be transmitted to the consumer analytics platform 108 to be analyzed.

In some embodiments, the consumer analytics platform 108 may analyze information about a consumer 102 in the context of paths taken by the consumer. A path is a movement of a consumer from one endpoint to another endpoint and possibly through intermediary points, where each endpoint and intermediary point is a setting. A setting is a geographic location visited by a consumer 102 that has some attached significance, such as a point of interest or a personally-relevant location for a consumer. Points of interest may be, for example, stores at which a consumer 102 stopped or a location on a road at which a billboard can be viewed, or other places with significance, and personally-relevant locations may be, for example, a home or workplace for a consumer or other location at which a consumer spends a lot of time. Points of interest could also be locations within shopping malls, such as stores within a shopping mall, or areas within a store, such as a particular department in a store.

Endpoints of paths are settings where consumers spend a lot of time and/or are often considered destinations for consumers, such as personally-relevant locations for consumers, and therefore provide start and finish points for paths. Using home and place of employment as examples of endpoints, paths can be taken by consumers from home to one or more other settings then back to home, from home to work and vice versa, from home to one or more other settings and then to work and vice versa, and from work to one or more other settings then back to work. Other endpoints are possible, and paths can be defined in the context of any endpoints.

FIG. 1 shows a few examples of paths that may be taken by a consumer 102 and that the consumer analytics platform 108 may monitor and analyze. The consumer analytics platform 108 may have information about personally-relevant locations for the consumer 102, such as a location of the home and the place of employment for the consumer 102. This information may have been provided by the consumer 102 or may have been identified by the consumer analytics platform 108 by observing that the consumer 102 spends a lot of time at night in one location, which is most likely the home of the consumer 102, and spends a lot of time during weekdays in another location, which is most likely the place of employment for the consumer 102.

FIG. 1 shows that the consumer 102 visited multiple locations in a series of movements one day and the consumer analytics platform 108 determined that these locations are associated with the illustrated settings 120-132. The consumer 102 started at home 120, visited a coffee shop 122, visited a gas station 124, drove on a highway 126, spent time at work 128, visited a restaurant 130, went back to work 128, spent time on the highway 126, went to a grocery store 132, and returned to home 120. As the consumer 102 visits each of these settings, the consumer analytics platform 108 obtains location data that identifies that the consumer 102 is at a geographic location associated with the setting. The consumer analytics platform 108 may then match the obtained geographic locations to known locations for settings to determine the setting corresponding to each geographic location. The consumer analytics platform 108 may then examine these settings and determine from them paths taken by the consumer 102, which may include first identifying settings that are endpoints. In the example of FIG. 1, there are two endpoints: home 120 and place of employment 128. From these endpoints, the consumer analytics platform 108 may determine that the consumer 102 went on three different paths: Path A home to work; Path B work to work; and Path C work to home. During Path A the consumer 102 visited the coffee shop 122, the gas station 124, and the highway 126. During Path B the consumer 102 visited the restaurant 130. During Path C the consumer 102 visited the highway 126 and the grocery store 132.

The consumer analytics platform 108 may analyze settings visited by the consumer 102 and the paths taken by the consumer 102, as well as other information about the settings visited by the consumer 102, to determine characteristic information for the consumer 102. For example, by examining the settings, the consumer analytics platform 108 may determine from the visits to the coffee shop 122 and the restaurant 130 that the consumer 102 regularly purchases meals and does not regularly make meals. Further, by analyzing path information for the consumer 102, the consumer analytics platform 108 may identify behaviors of the consumer 102, like that the consumer 102 is a commuter and that the consumer 102 makes multiple stops during a normal day. The consumer analytics platform 108 may also determine that the consumer 102 commutes by car, rather than by public transportation. By comparing these paths to information previously gathered about a consumer 102, more information about the consumer 102 may be determined. For example, if the consumer 102 does not regularly visit a grocery store 132 on the way to home 120 from work 128, and if an advertisement for the grocery store 132 or for a food product was located on the highway 126, the consumer 102 may be determined to be swayed or swayable by the advertisement or similar advertisements.

Through analyzing multiple paths and anchors over time, the consumer analytics platform 108 may be able to confirm, refine, or correct these determined characteristics of the consumer 102. When other location data is obtained, such as location data collected during weekend activities of the consumer 102 or travel activities, that location data can be used to determine other characteristics of the consumer 102. Information about the consumer 102 can be stored in a profile for the consumer 102 and can be combined with information about other consumers to determine information about the consumers.

The consumer analytics platform 108 may use the characteristic information for each consumer in any suitable manner or present the characteristic information to any suitable party. In some cases, businesses 110 will request that the consumer analytics platform 108 perform a study and provide the business 110 with information about consumers 102, such as information about consumers 102 that patronize the businesses 110. The consumer analytics platform 108 may then review the characteristics for multiple consumers determined through the analysis and produce inferences and predictions regarding the consumers. These inferences and predictions may be made based on the characteristics determined from the analysis. For example, the inferences and predictions may include additional characteristics that were inferred or predicted for a group of multiple consumers. As another example, the inferences and predictions may include information on how consumers may be expected to react to potential business decisions, including information on potential outcomes of one or more proposed scenarios.

Information yielded by the inferences and predictions that are returned to the business 110 as results of the study may be used by the businesses 110 in any suitable manner. For example, if the coffee shop 122 were to discover based on information provided by the consumer analytics platform 108 that the majority of its customers are car commuters rather than people who work locally, the coffee shop 122 may decide to offer more products packaged to be taken in a car. As another example, the coffee shop 122 may identify interests or preferences of consumers 102 that live near the coffee shop 122 and go to a competitor coffee shop, such that the coffee shop 122 could determine how to encourage those consumers 102 to visit the coffee shop 122. Or, if the grocery store 132 determines that many of its customers live far away from its store, the grocery store 132 may decide to build a new store closer to those customers and may select a location of the new store based on routes traveled by consumers, locations of other stores that the consumers are detected to visit, or information on potential outcomes for each of multiple proposed locations (e.g., numbers of consumers that will shop at each proposed store). As another example, if the grocery store 132 was running advertisements on the highway 126 that appeared to convince people who were not planning to visit the store to do so, the grocery store 132 may infer that the advertisements are effective and continue using those advertisements. Information about characteristics of consumers 102 can be used in any suitable manner by a business 110.

Illustrative Systems

Described below are examples of various systems and techniques that may be implemented in some embodiments for operating a consumer analytics platform to obtain location data for consumers and analyzing that location data to determine characteristics of consumers. Embodiments are not limited to implementing these exemplary systems and techniques, as others are possible.

Figure 2:
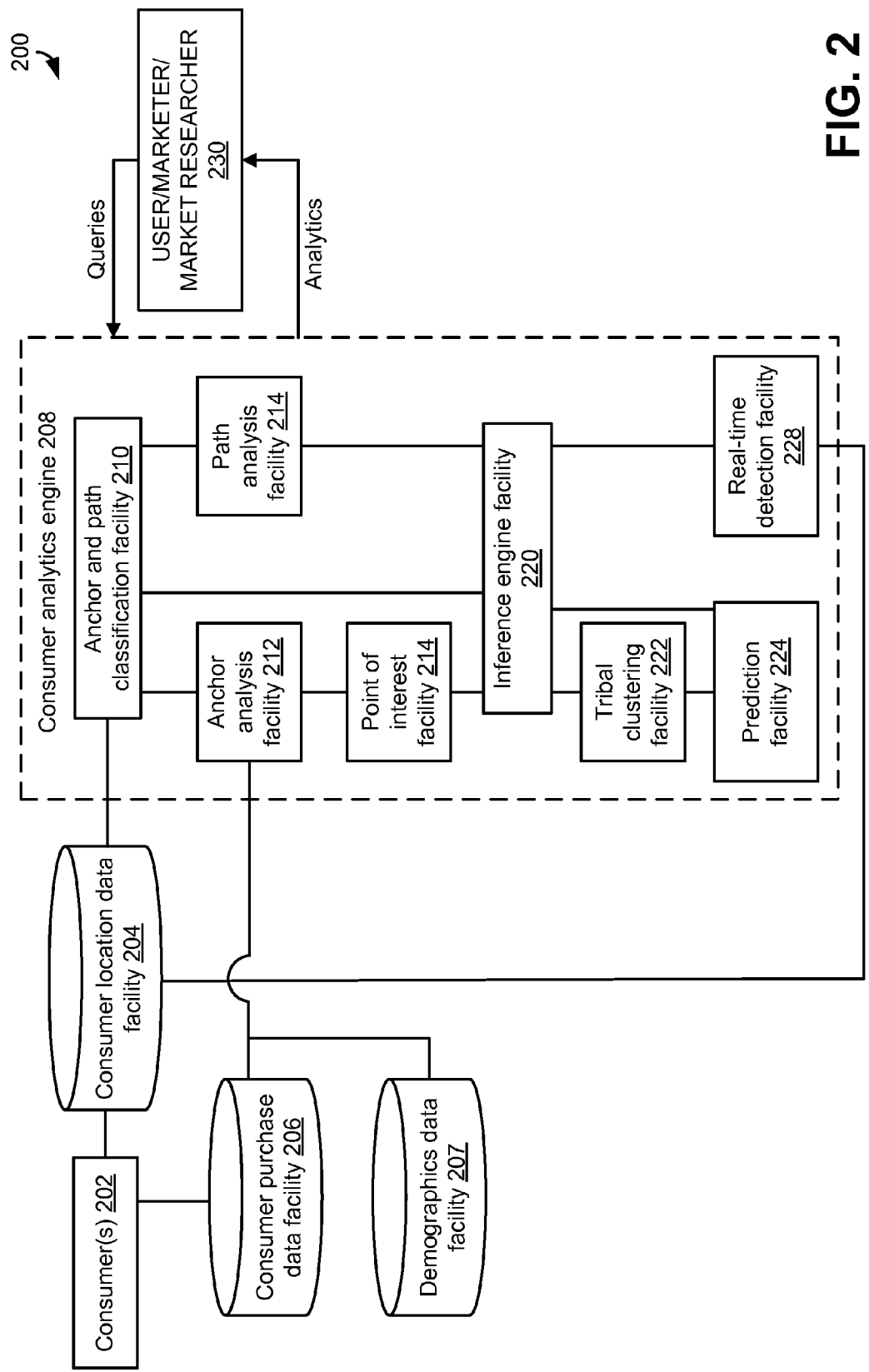
FIG. 2 is a block diagram of one exemplary system that may analyze location data as part of a consumer analytics platform.

FIG. 2 illustrates one exemplary consumer analytics platform 200 for obtaining and analyzing location data for consumers. In embodiments, the platform 200 may include one or more consumers such as a consumer 202, a consumer location data facility 204, and a consumer analytics engine 208. As the consumer 202 passes through multiple locations, data about each location visited by the consumer 202 may be obtained by the consumer location data facility 204 and stored. For example, the consumer 202 may visit a shopping mall, a retail store, workplace, residential place, an entertainment center, and the like. The consumer location data facility 204 may obtain location data for each of the locations through which the consumer 202 passed. The location data obtained by the facility 204 may be passed to the consumer analytics engine 208 for analysis. After analysis is carried out, inferences and predictions based on information about consumers 202 may be provided to market researchers 230, such as in response to studies requested by the researchers 230.

The consumer location data facility 204 may obtain location data from a consumer 202 in any suitable manner. In embodiments, the consumer 202 may have access to an electronic device, such as a location-capable electronic device, that can be used by the consumer location data facility 204 to obtain location data for the consumer 202. For example, the electronic device may determine a location of the consumer 202 and transmit the location to the consumer location data facility 204. The electronic device may transmit the location data in response to a request for location data (e.g., from the consumer location data facility 204) or of its own initiative. The location of the consumer 202 may be obtained using any electronic device. In some cases, the electronic system may be co-located with the consumer 202. Examples of electronic devices include, but are not limited to, location-aware mobile telephones, GPS-enabled tracking devices, personal navigation devices, in-car navigation devices, and the like.

Location data may be obtained for each consumer 202 and stored by the consumer location data facility 204. The location data that is obtained for each consumer 202 may include any suitable location information that can be received from electronic devices of the consumers 202 or determined through analysis. In embodiments, location data for the consumer 202 may include geographic information for a location, an error margin for the geographic information, and a time that location was visited by a consumer 202. The geographic information may include any suitable global geographic information, such as latitude and longitude, and/or local geographic information such as street addresses or locations within buildings. The error margin may identify a range of other locations near the geographic location that may be the actual location of the consumer 202 and allows systems receiving the location data to account for imprecision in the identified location.

Some consumers 202 may volunteer to provide their location data, while others may be enticed to do so. For example, the consumer 202 may be interested in providing information to businesses in which the consumer 202 is interested (e.g., businesses at which the consumer 202 shops) because the consumer 202 is interested in helping those businesses by providing them with information. Or, in other cases, the consumer 202 may provide location data in exchange for discounts at these businesses or some incentive from an operator of the consumer analytics platform 200. In many embodiments, consumer privacy may be important and location data is only obtained for consumers when the consumers agree to provide the location data. Though, in some cases privacy may not be a concern and location data for consumers can be retrieved without permission of consumers.

The consumer location data facility 204 may receive and store the location data of multiple consumers 202 in any suitable manner, as embodiments are not limited in this respect. Location data that is stored by the consumer location data facility 204 may be processed by components of the consumer analytics engine 208, including the anchor and path classification facility 210, to determine further information about consumers 202. The location data may be passed at any suitable time and in response to any suitable conditions.

Consumer location data facility 204 may also obtain location data at any suitable time. In some embodiments, the consumer location data facility 204 may be operated by a same entity that operates the consumer analytics engine 208 and the facility 204 may actively obtain and store location data for the consumer 202, and may pass the location data to the engine 208 upon obtaining the information. In other embodiments, the facility 204 may be operated by a different entity and may obtain location data only in response to a request from the consumer analytics engine 208. In some embodiments where the facility 204 is operated by a different entity, the facility 204 may be a cellular communication network with an interface that allows for requesting and receiving location data for a particular device attached to the cellular communication network. In these embodiments, the interface may be the same or a similar interface to an interface used for Enhanced 911 (E911) systems to obtain location data from a mobile phone that has made an emergency call. In some other embodiments in which the facility 204 includes a cellular communication network, however, the consumer analytics engine 208 may be able to communicate freely and directly to a device attached to the cellular network or receive information from a device attached to the cellular network, or in any other way, rather than only communicating via a designated interface.

However the consumer location data facility 204 obtains location data, the consumer analytics engine 208 may obtain and analyze the location data. The consumer analytics engine 208 may include various components to perform an analysis of location data received from the consumer location data facility 204. As shown in FIG. 2, in some embodiments the engine 208 may include an anchor and path classification facility 210, an anchor analysis facility 212, a path analysis facility 214, a point of interest facility 218, an inference engine facility 220, a tribal clustering facility 222, a prediction facility 224, and a real-time detection facility 228. The consumer analytics engine 208 analyzes location data and is able to identify characteristics for consumers based on analysis of the location data and is able to produce inferences and predictions based on the characteristics resulting from the analysis, while protecting consumer privacy.

In addition to location data, in some embodiments other data may also be provided to a consumer analytics engine 208. For example, purchase data and/or demographic data may be made available to the consumer analytics engine 208.

Consumer purchase data may be provided by the consumer purchase data facility 206 with or without request by the consumer analytics engine 208. Consumer purchase data may include any suitable information about consumer purchases that may be provided by businesses at which consumer shop or financial companies with which customers have relationships. Purchase data may also be provided by consumers themselves, such as in responses to surveys. Businesses may obtain data about consumer purchases when the consumers provide to businesses personal information to associate the consumers with purchases. This may be the case when the consumers participate in programs (e.g., rewards or loyalty programs) with the businesses, such that the consumers identify themselves at the time they purchase goods or services. Similarly, financial companies may obtain information about consumer purchases when the consumers use credit cards, debit cards, checks, layaway programs, or other financial products to purchase goods or services.

Demographic data may also be provided by a demographics data facility 207 in some cases. Demographics data may be used to identify demographic information associated with particular areas. For example, from census data and other sources, incomes, education levels, and household sizes can be stored for particular areas like ZIP code areas. This information can then be provided to the consumer analytics engine 208 in response to a request from the consumer analytics engine 208 or without a request from the engine 208.

Consumer purchase information may be aggregated for each consumer and provided to the consumer analytics engine 208 to be analyzed alongside location data for consumers. The consumer analytics engine 208 may join the purchase data with the location data in any suitable manner to determine a correspondence between location data and purchase data for individual consumers. This join may be carried out in any suitable manner. For example, if a consumer provides a phone number to businesses or financial companies, that phone number may be provided alongside the purchase data and may be used to identify location data for the consumer in embodiments where location data is retrieved with the assistance of a cellular telephone.

Demographic information may be associated with consumers using techniques described below. Briefly, when a place of residence is determined for a consumer, demographic information associated with that community may be retrieved and used to determine characteristics of the consumer.

The consumer analytics engine 208 may include any suitable components for performing any suitable analysis of location data relating to consumers 202 to determine characteristics of the consumers 202. In embodiments, the anchor and path classification facility 210 may receive location data for the consumer 202. The anchor and path classification facility 210 may receive input in the form of a set of data points representing geographic locations visited by a consumer and may determine settings visited by a consumer and a path taken by the consumer to visit the settings.

In some cases, the anchor and path classification facility 210 may filter received location data to remove excess or redundant pieces of location data. This filtering may include attempting to identify pieces of location data that relate to a same or similar location. Through this process, a number of "anchors" can be determined that are geographic locations at which a consumer stopped. Each anchor may be related to one or more pieces of location data, depending on a frequency with which location data was obtained for the consumer and how long the consumer spent at the anchor. Analyzing anchors rather than analyzing all of the location data for a consumer may be useful, as identifying places at which a consumer stopped or spent a great deal of time may provide more information about characteristics of a consumer than locations through which a consumer passed without stopping.

To identify anchors, the anchor and path classification facility 210 may cluster sequential location points for a consumer 202 to identify location points that are related in time or distance. For example, such a clustering of the sequential location points may be carried out using Euclidian distance clustering. In one example of a Euclidean distance clustering, locations within 400 feet of one another may be identified as being related to a same potential anchor. Additionally, by comparing time differences between location points related to the same potential anchor, a duration of time spent by consumer 202 at the potential anchor can be determined. Each cluster of locations associated with a duration above a threshold, such as duration of greater than ten minutes, can be identified as an anchor. An anchor, in embodiments, may then be defined for the consumer 202, based on the location data, that represents a similar location and a corresponding time interval. The anchor and path classification facility 210 may store as a location of the anchor a calculated location for the anchor, which may be an output of a mathematical operation involving individual location data points for the anchor. In some embodiments, the calculated location for an anchor may be a geometric mean of the individual location data points associated with the anchor. The anchor and path classification facility 210 may also store the individual location data points associated with an anchor.

Once anchors are identified, the anchor and path classification facility 210 may define a set of anchors as a path. A path is a set of anchors, with a route between them, that a consumer 202 visited in series. A path includes two anchors that are endpoints and may or may not include anchors that are intermediary points, depending on what the consumer was doing and where the consumer stopped. As discussed above, the endpoints may be settings known to be associated with the consumer 202 and that may be considered ultimate destinations when a consumer 202 is traveling. Endpoints include personally-relevant locations for consumers, including places of residence and employment for the consumer 202, but may be anywhere that marks the ultimate destination or end of an outing. Intermediary anchors may be settings that the consumer 202 visited during a path. For example, during a shopping trip on the weekend, the two endpoints for the trip may be the home of the consumer 202 and intermediary points may be stores and restaurants that the consumer 202 visited after leaving home and before returning home.

Identification and analysis of anchors and paths by the anchor and path analysis facility 210 may be aided by an anchor analysis facility 212 and a path analysis facility 214. Information about locations, clusters, anchors, and paths may be provided to one or both of the anchor analysis facility 212 and the path analysis facility 214.

The anchor analysis facility 212 may generate from location data regarding locations visited by a consumer 202 a list of unique physical locations visited by each consumer 202 that can be used by the anchor and path facility 210 to identify anchors. This unique list may also be analyzed to determine patterns in places visited by the consumer 202.

In some embodiments, the anchor analysis facility 212 may maintain or determine some information for each location in the set of unique locations. For example, a number of times that a consumer 202 visits the location may be identified and times of day the consumer 202 has visited or typically visits the location can be identified. A frequency of visit or time interval between visits may also be identified for the location and the consumer 202. If multiple pieces of similar location data are used to identify a location as an anchor in one path, information about times at which the location was visited may be used to determine a length of a visit to an anchor during a path. When location data is collected for multiple paths, average lengths of visits or patterns in lengths of visits may be identified.

Anchor analysis facility 212 may also analyze anchors to identify those corresponding to settings that are personally-relevant locations for a consumer 202, including identifying locations corresponding to places of residence and employment of the consumer 202. To do so, anchors corresponding to locations that a consumer 202 often visits and where the consumer 202 spends many hours can be identified. Next, time-of-day and day-of-week criteria may be applied to those anchors. The time-of-day and day-of-week criteria may be used to make infer whether those anchors correspond to personally-relevant locations. For example, based on these criteria, an anchor at which the consumer 202 spends eight hours during the day on weekdays may be the place of employment for the consumer 202 and an anchor at which the consumer 202 spends eight hours during the night on weekdays may be the place of residence for the consumer 202. Other criteria may be used to similarly identify other personally-relevant locations. These personally-relevant locations for a consumer may be identified as potential endpoints and may be used by the path analysis facility 214 to identify paths.

The path analysis facility 214 may analyze information regarding paths identified by the anchor and path analysis facility 210, as well as aid the facility 210 in identifying paths. As discussed above, a path can be identified as a set of anchors and a route between anchors that is bound by a beginning endpoint and an ending endpoint. When a path is identified, the path analysis facility may analyze the path to determine information about the path. For example, the facility 214 may perform a quantitative analysis on a path to identify quantitative attributes of the path. Quantitative attributes include, but are not limited to, a total distance traveled, an average speed of travel, and a path duration. The path analysis facility 212 may also identify qualitative attributes of a path, including whether the path was one-way or round-trip by determining whether the endpoints are the same anchor, or determining a type of transportation used during the path by analyzing the route taken and the speed of travel. Other qualitative attributes include a purpose of the path, which may be inferred through analyzing the attributes of anchors visited during the path. Settings corresponding to anchors visited during a path may be identified using the point of interest facility 218, which is discussed below. If only one anchor was visited and the anchor corresponds to a store, then the path may be related to shopping for a particular item or type of item. If the anchors of a path are each related to stores of a same type, then the path may be related to shopping for a particular product or type of product. If the anchors of a path are related to multiple stores of a different type, then the path may be related to a general shopping trip for many different types of items. Paths may be related to other activities, not just shopping. If a path includes a visit to a public park or public playing field, the path may be related to exercising. If the path includes a lengthy visit to an anchor very far away from the home of the consumer 202, then the path may be related to a vacation or business trip taken by the consumer 202. Any suitable attributes of anchors may be used to identify a purpose of a path.

Patterns in paths may also be identified by the path analysis facility 214. For example, when purposes of paths are identified, particular types of paths may be analyzed. For example, a quantitative analysis can be carried out on a type of path to determine an average length of that type of path in distance and/or in time, or an average length of time between paths of that type. Patterns in paths can also be identified based on settings corresponding to anchors in paths, such as how often a consumer 202 visits two particular settings together in a path and how often the consumer 202 visits two particular settings in different paths. Similarly, patterns can be detected in how often anchors of particular types are visited together in the same paths or in different paths. Patterns in attributes of paths can also be compared to settings. For example, patterns in length of paths that include a particular setting or type of setting can be determined, and patterns in purpose of paths that included a visit to a particular setting or type of setting can be identified. Any suitable patterns can be identified to yield any suitable information about paths of a consumer 202.

The anchor and path classification facility 210, the anchor analysis facility 212, and the path analysis facility 214 were all discussed above in the context of determining information about anchors and paths visited by a single consumer 202. In some embodiments, these facilities may also determine information about multiple consumers 202. Patterns in anchors and paths for multiple consumers 202 could be identified. Any of the exemplary types of patterns described above could also be determined across multiple consumers 202.

The anchors discussed above that were determined based on the location data are locations identified by groups of location data obtained for a consumer 202. Additional information about a location may be determined by identifying a setting corresponding to a location. A setting may be a place associated with a location, such as a business or office that is associated with a geographic location of the business/office, that is associated with some meaning, such as being associated with some behavior or type of behavior. Information about settings may be useful in analyzing anchors and paths, as the settings can provide information about activities in which a consumer may have engaged at that geographic location, which could provide more information on characteristics of the consumer.

The point of interest facility 218 of the consumer analytics engine 208 may provide additional information that may be useful in analyzing anchors and paths. For an anchor, the calculated location (e.g., geometric mean location) of the anchor may be cross-referenced to a data set of settings maintained by the point of interest facility 218. The data set of the point of interest facility 218 may include information on geographic locations and activities associated with personally-relevant locations for individual consumers and with points of interest (POIs) that include places that consumers may visit. Each POI may be a place that a consumer 202 could visit, such as an office, shop, concert venue, restaurant, or other places.

A setting in the POI data set may be defined in part by a geographic location for the POI. The geographic location for the POI may be defined and stored in any suitable way, including as a point or a polygon. Where the location is defined by a point, the point may be associated with a latitude/longitude corresponding to the point and a radius around the point. Where the location is defined by a polygon, edges and vertices of the polygon may be each defined by a latitude/longitude. When a calculated location for an anchor and/or other locations within the error margin for the calculated location of the anchor fall within the radius of a point or within the edges of the polygon, the anchor may be determined to correspond to that POI and, accordingly, the consumer 202 may be determined to have visited that POI.

In some cases, determining to which setting a geographic location visited by a consumer or an anchor relates may include choosing between multiple settings. This may be the case where the error margin indicated by the location data overlaps with the locations (e.g., the polygon or the point and radius) for multiple different settings. In such a case, a particular setting to which the location data corresponds may be selected in any suitable manner. For example, a probability may be calculated for each potential setting that each potential setting is the setting visited by the consumer. Such a probability may be calculated based on information about the location and/or about the consumer. When information about the location is used, then a setting closest to the geographic location of the consumer may be selected or a setting with a location area (e.g., the polygon or the point and radius) having the greatest overlap with the area of the error margin for the consumer may be selected. When information about the consumer is used, then information about settings previously visited by the consumer, which may be derived from information like purchase data provided by consumer purchase data facility 206, may be used to select a most likely setting visited by the consumer. For example, if two potential locations are a fast food establishment and a sporting goods store, and the consumer has never visited a fast food establishment but often visits sporting goods stores, then the more likely setting may be determined to be the sporting goods store. When information about the location and/or the consumer is used, probabilistic inference techniques may be used to make the determination of the probabilities associated with each setting. For example, the problem may be modeled using a Bayesian Network such as a Hidden Markov Model. When a Hidden Markov Model is used, the hidden state may be the visited setting and location data for the consumer may be input as observations. The Hidden Markov Model may then be evaluated using techniques like the Viterbi algorithm to determine the most likely setting visited by the consumer.

As discussed above, a type of setting or an activity engaged in by a consumer 202 may be used to make determinations about a consumer 202 or about paths taken by the consumer 202. Accordingly, the setting data set may include information about each setting.

In some cases, information about behaviors may not be known for personally-relevant locations that are identified by the anchor analysis facility 212 and may not appear in the data set, while in other cases the behaviors may be identified based on assumptions about a type of the personally-relevant location (e.g., home or work location).

Each POI, however, may be associated in the data set with at least one description of the POI and at least one categorization of the POI. In some cases, a type of POI or a type of activity engaged in at the POI may be the same at all times. In this case, information about the POI can be retrieved and analyzed once the geographic locations are determined to match. In other cases, however, a type of POI or the activities for a geographic location may vary based on time. For example, a POI that is a restaurant at mid-day may become a nightclub at night. As another example, an arena may host basketball games, hockey games, and concerts at different times. For these POIs, a time that the consumer 202 visited the POI may be used to determine the type of POI or activities in which the consumer 202 engaged at the POI.

As a result, in some embodiments, POIs may be categorized in the data set of the POI facility 218 based on location and time. The location categorization may include a categorization of the types of activities in which a consumer 202 could engage at the POI at any time. For example, a location categorization may indicate that a POI is a sports venue, quick-service restaurant, low-cost retailer, or other type of organization. A time-based categorization may indicate, of the location-based categories, a type of activity in which a consumer 202 could engage at a particular time. The time-based categorization of the data set of the facility 218 may be populated by externally-available information about the POI. For example, event schedules, transit schedules, air travel schedules, and the like and may be retrieved for a POI and stored and used to determine activities in which a consumer 202 could engage at a time and, from that, a time-based categorization of the POI.

Using the location and time-based categorization, each POI may be assigned to one or more defined category of activities related to POIs. In an exemplary scenario, POIs may be categorized as relating to restaurants, lodging, parks and recreation, sports and fitness, nightlife, sites of outdoor or indoor advertisements (e.g., billboards), school/university, pharmacies, supermarkets, and work places, among others. When a consumer 202 is determined to have visited a POI, a category of POI may be selected based on factors like time, and information about the POI may be provided for analysis. For example, the information about the POI may be used by the facilities 210, 212, and 214 as discussed above.

The consumer analytics engine 208 can also analyze the information collected from location data and data sets, and from consumer purchase data facility 206 and the demographic data facility 207, to determine characteristics of the consumers. The characteristics of a consumer 202 that may be determined through this analysis include characteristics of an identity of the consumer 202, behaviors of the consumer 202, and preferences of the consumer 202. Further, behaviors of the consumer 202 may be used to determine categories of behavior in which the consumer 202 engages and behavior groups to which the consumer 202 therefore belongs.

To perform this analysis, the consumer analytics engine 208 may analyze information received from the consumer location data facility 204 and determined by the anchor analysis facility 212, path analysis facility 214, and point of interest facility 218. The consumer analytics engine 208 may use any suitable computer learning technique to identify relationships between locations, consumers, anchors, and paths, and patterns in those relationships. For example, based on information about one consumer a relationship may be established between two anchors that identifies that a consumer that visits one anchor is somewhat likely to visit the other anchor. Similarly, relationships may be identified between paths or attributes of anchors and/or paths. These relationships may be adjusted as information about other consumers is reviewed. For example, if another consumer is detected to visit the same two settings, then a relationship between the settings may be strengthened. On the other hand, if another consumer is detected to visit one setting and not the other, a relationship between the settings may be weakened. Relationships can be both positive and negative, such that a relationship could indicate either that two settings are very likely to be visited together or are very unlikely to be visited together.

Data regarding the strength/weakness of these relationships may be stored in any suitable manner, including using confidence values. As the consumer analytics engine 208 examines the data for consumers and establishes and adjusts relationships, the consumer analytics engine 208 may assign confidence values to the established relationships indicating how likely or true the engine 208 believes the relationship to be. These confidence values may be adjusted over time, as the consumer analytics engine 208 learns more and becomes more or less confident in particular relationships.

The relationships learned by the consumer analytics engine 208 can be used to analyze the location data, anchors, paths, and patterns for consumers to determine characteristics of consumers.

Based at least in part on these relationships, the consumer analytics engine 208 can generate guesses regarding characteristics of a consumer 202. These relationships can be used to determine, when a consumer 202 matches one side of a relationship, how likely the consumer 202 is to match the other side of the relationship when there is no data available to indicate directly whether the consumer 202 matches the other side of the relationship. As a specific example, if the consumer 202 is detected to visit a first POI but not a second POI, and the engine 208 has detected a relationship between the first and second POIs, the engine 208 may determine how likely the consumer is to visit a second POI. In these cases, the strength of the relationship as determined by the learning algorithm can determine the likelihood of the consumer 202 matching the second part of the relationship.

The consumer analytics engine 208 may determine characteristics in any suitable manner. In some embodiments, the engine 208 may examine patterns in paths and/or anchors, and/or patterns in purchase data, to infer characteristics of a consumer 202. For example, the engine 208 may examine patterns in the settings and the types of settings visited by multiple consumers 202 and the times of those visits. Patterns in settings may be defined by patterns in repeat visits to a particular POI or by repeat visits to a category of POI. Patterns in times may be defined by patterns in, for example, the time of the day when POIs were visited, day of the week for the visited POIs, seasonality and duration of each visit, the speed of travel between locations, etc. Such patterns may be identified based on location data and/or purchase data for consumers.

By examining these patterns, various conclusions could be drawn. For example, the engine 208 may determine whether a consumer that has visited certain POIs or takes certain paths is likely to visit a particular POI. As another example, the engine 208 may determine information about the regularity of the daily routine of a consumer 202 and then make inferences regarding whether the consumer 202 is likely to maintain an unvarying schedule and whether the consumer 202 is likely to visit different POIs or different types of POIs. This may be useful in determining how likely a consumer 202 is to be swayed to visit a POI that the consumer 202 has not previously visited, including POIs that the consumer 202 regularly passes but does not visit. Similarly, frequency of visits to a particular POI and POIs that are frequently passed but not visited may be used by the engine 208 to infer strength of brand preferences and loyalties of a consumer 202. For example, if a consumer 202 visits two stores of the same type, but visits one more frequently than the other, the engine 208 may infer that the consumer prefers the more-visited store to the other.

Patterns in paths, such as frequency or timing with which paths of a certain type are made by a consumer 202, may yield inferences about behaviors of the consumer 202 or preferences the consumer 202 has for paths with certain purposes. For example, if a consumer 202 is determined to be visiting many car dealerships in multiple paths, the consumer 202 may be inferred to be shopping for a car. Similar conclusions can be made about shopping for homes by analyzing patterns in visits to real estate brokers, banks, and/or open houses, particularly if those visits depart from previous behaviors of a consumer 202. Similarly, when a consumer 202 often visits sports venues and sports bars, the consumer analytics engine 208 may infer that the consumer 202 is a fan of sports, while if the consumer 202 often visits gyms and public playing fields in addition to sports venues and sports bars, the consumer 202 may be inferred to be an "active" person. Deviations from patterns may also be notable, such as when a consumer 202 visits a setting they have not previously visited or at a time that the consumer 202 does not typically visit that setting. If an advertising campaign is underway for the setting, the consumer analytics engine 208 could infer from the deviation in the consumer's behavior patterns that the consumer 202 was swayed by the advertising campaign. The engine 208 may also make this conclusion if the analysis shows the consumer 202 passed by a setting associated with a billboard used by the advertising campaign, and thus likely viewed the billboard, prior to deviating from the behavior pattern.

Characteristics may also be determined by the consumer analytics engine 208 by comparing location data and data about settings visited by consumers to demographic data from the demographic data facility 207. For example, when a consumer's place of residence is identified using, for example, techniques described above, demographics associated with a consumer's community may be used to identify characteristics of the consumer, such as income, education, and family size characteristics, among others.

Characteristics of a consumer determined by the consumer analytics engine 208 may also be entered into the tribal clustering facility 222. The tribal clustering facility 222 clusters consumers' patterns and behaviors into tribes, which are behavior groups associated with one or more consumer characteristics. A tribe may be established around any suitable characteristic(s), including lifestyle-relevant behaviors, retail-relevant behaviors, places visited, schedules, preferences, and other characteristics. Some tribes may be related to particular market segments, such as demographic segments or consumption habit segments, and other tribes may be related to lifestyle habits like recreational interests and regularity of schedules.

Exemplary tribes that may be monitored and maintained in some embodiments include a home-oriented tribe for people who are often at home; a work-oriented tribe for people who are often at work; a commuter tribe for consumers who travel long distances between home and work; "early riser" and "late-riser" tribes dependent on when a consumer leaves their home for the day; a nightlife tribe for consumers who are often out late at night; an "active lifestyle" tribe for consumers who are detected to be partake in athletic activities (e.g., visit gyms and public playing fields); sports fans and sub-tribes for fans of particular teams and/or sports for consumers who are detected to go to sporting venues and sports bars; store-based tribes for consumers detected to often shop at particular stores; shopping tribes for consumers who have particular shopping habits, like single-store shopping trips, multi-store shopping trips, following a strict shopping routine, and shopping for a particular item (e.g., car, home, etc.); frequent flier tribes; frequent overnight traveler tribes; and tribes relating to whether a consumer has been or potentially has been exposed to an advertisement of a marketing campaign (e.g., a billboard). A consumer could be identified as belonging to one or more of these tribes and/or other tribes based on obtained location data and information derived from analysis by facilities 208, 210, 212, and 214.

The tribal clustering facility 222 may maintain information about multiple different tribes and may determine, based on information determined by the consumer analytics engine 208, whether a particular consumer 202 belongs to a tribe. This may be done by comparing requirements or conditions for each tribe to information known about a particular consumer 202. If the information known about the consumer 202 from the analysis of the engine 208 matches the conditions/requirements of a tribe, then the consumer may be determined to be in the tribe. As a specific example, the "sports fans" and "active lifestyles" tribes may have the requirements discussed above—visits gyms and public playing fields for "active lifestyles" and goes to sporting venues and sports bars for "sports fan"—and a consumer 202 may be associated with these tribes when the consumer analytics engine 208 determines that the consumer 202 has characteristics meeting those requirements. As another example, the engine 208 may determine through its analysis that a consumer 202 is a frequent flier when paths of the consumer 202 often include two anchors separated by a large difference in time and distance with no location points in between. This difference could indicate that the consumer 202 traveled on a plane between the two anchors. When these anchors are noticed multiple times by the engine 208, the engine 208 may mark the consumer 202 as a flyer. When the tribal clustering facility 222 observes the mark relating to the consumer 202, the facility 222 may identify that the consumer 202 is in the frequent flier tribe.

Of course, as discussed above, the consumer analytics engine 208 may adjust relationships and conclusions over time, as the engine 208 learns more about a relationship. Further, habits of a consumer 202 may change over time. As such, a consumer 202 that is placed into a tribe may be removed from a tribe if information about the consumer 202 changes for any reason.

Location data, purchase data, and/or information determined about a consumer 202 may be stored by the consumer analytics engine 208 in a profile for the consumer 202. Profiles may be similarly maintained for each consumer 202 for which the consumer analytics engine 208 obtains location data and perform analysis. The profiles for each consumer 202 can include any of the characteristics determined by the consumer analytics engine 208 or facilities included by the consumer analytics engine 208, including identity, behavior, and preference characteristics. A profile may be stored and formatted in any suitable manner, as embodiments are not limited in this respect. In some embodiments, a single contiguous data structure may store the characteristic information for a profile for one consumer, while in other embodiments characteristic information may be stored for one consumer in multiple different data units.

By storing characteristics in profiles for each consumer, the characteristics can be later reviewed and used in consumer studies to identify further consumer analytics. In some embodiments, the consumer analytics engine 208 may receive requests for studies to be performed to further identify the characteristics of consumers, such as from market researchers 230. Results of a study can be based at least in part on review of characteristic information included in profiles for consumers, which may yield information related to a topic of the study. For example, review of the characteristics may yield information related to a business (or other organization) sponsoring the study, or other businesses (or other organizations) related to the business sponsoring the study.

Computations based on these characteristics may yield inferences and predictions for the consumers 202 based on the characteristics. As illustrated in FIG. 2, an inference facility 220 and prediction facility 224 are included in the consumer analytics engine 208 and may be used to produce inferences and predictions from the profile data for consumers 202.

The inferences and predictions made by facilities 220, 224 may be performed in the context of a study requested by a market researcher and surrounding a particular topic. Accordingly, the inferences and predictions may be related to the topic of the study. For example, when a study is requested on behalf of a particular business, inferences and predictions may be made regarding consumer characteristics that are related to that business. As another example, inferences and predictions may be made about what consumers may do given one or more conditions or how consumers may react in a proposed scenario or in each of multiple proposed scenarios. Consumer characteristics related to a business may include characteristics of consumers' interactions with the business and/or interactions with related businesses including competitors and businesses of the same or similar type. Consumer characteristics may include identity, behavior, and preference characteristics for consumers that are related to the business, including what types of consumers interact with the businesses, how or when the consumers like to interact with the business, or how likely particular types of consumers are to interact with the businesses in the future.

The inferences and predictions of facilities 220, 224 may be based on a learning algorithm that identifies relationships, similar to relationships described above. The learning algorithm may identify patterns in characteristics of consumers from the profile data and use those relationships to identify characteristics related to the topic of the study. Inference facility 220 may use the relationships to determine current characteristics of consumers related to the business, including current identities, behaviors, and preferences of consumers with respect to the business. Prediction facility 224 may use the relationships to determine future characteristics of consumers related to the business, including future identities, behaviors, and preferences related to the business.

A specific example of a study is one commissioned by a business that is a restaurant, to determine characteristics of its customers. A current characteristic that can be inferred by the inference facility 220 is that consumers are more likely to visit the restaurant for lunch when going on long-duration, general shopping trips and than when on a short shopping trip for a particular item. This may be based on an inference regarding detected behaviors of consumers, that the restaurant was most often visited by consumers during paths that were identified to be "general shopping" trips and that were long. A future characteristic that can be predicted by the prediction facility 224 is that many consumers will visit the restaurant on a particular holiday weekend. This may be based on a detection that consumers most often engage in general shopping on holiday weekends, as well as that consumers most often visit the restaurant during "general shopping" trips, such that the prediction facility 224 may predict that many consumers will be on general shopping trips on the particular holiday weekend.

In this way, the consumer analytics engine 208 may obtain location data and/or purchase data, perform analysis on the location data and/or purchase data to identify characteristics of consumers, and then review the characteristics and compute inferences and predictions based on the consumer characteristics and behaviors.

The inference facility 220 and the prediction facility 224, when generating inferences and predictions, may generate confidence values that indicate how confident the facilities are in the inference/prediction, which can indicate how likely the inference/prediction is to be true. These confidence values may be related to the strength of the relationships, determined by the learning algorithm, on which the inferences/predictions are based. In some embodiments, these confidence values can be output as part of the inference/prediction, such that someone reviewing the inference/prediction may be aware of the strength of the inference/prediction.

As mentioned above, a study to be performed using the consumer analytics engine 208 may be requested by a market researcher 230. Market researchers 230 (including both professional market researchers and laymen performing market research) may wish to determine more information about consumers 202 that are customers of or potential customers of a business or a type of business, or may wish to know more about consumers 202 with respect to any other topic. For example, the market researchers 230 may wish to know about the identities of consumers 202, such as demographic characteristics for consumers 202 that regularly visit the business, that have visited the business, or that regularly pass by the business but have not visited. The market researchers 230 may also wish to know about inferred preferences of consumers 202 that have not visited a business but have visited the business' competitors. Similarly, the market researchers 230 may wish to know how many consumers 202 passed by an advertisement and subsequently visited a business associated with an advertisement, including those who visited the business for the first time. Such inferences and predictions may be yielded from the analysis of the profile data, including the location data, purchase data, and/or information yielded from analysis of the location and/or purchase data.

The interface by which the consumers 230 may query the data set may allow for any suitable queries to be made, including any suitable filter terms or conditions. For instance, a market researcher 230 may assemble one or more set of queries that attempt to collect data regarding a specific consumer sample population. Additionally or alternatively, the queries may be created with conditions that attempt to focus results to as to answer specific questions posed by or to the market researcher or to try to solicit information with various levels of detail. Answers to the queries may be provided by engine 208 based on inferences and predictions drawn from the obtained location data and the results of the analysis performed on the location data, which are stored in the profiles for each consumer.

Once market researchers 230 have the information from the consumer analysis engine 208, the researchers 230 and/or the businesses with which the researchers 230 may be affiliated may make decisions using the information. For example, store siting decisions could be made with this information. Once a set of characteristics associated with consumers that visit a store or a type of store are determined, queries can be made for places of residence or employment for consumers that match those characteristics. Additionally, places of residence or employment for consumers that already visit the store can be determined. Distances that consumers travel or will travel to the type of store can be queried, as well. Once these places and distances are determined, the business can determine where to place a store that will have a good likelihood of being visited by existing or potential new consumers. Advertising effectiveness can also be determined based on results of queries to the engine 208 regarding consumers that potentially viewed an advertisement and subsequently visited or purchased goods or services at a business associated with the advertisement (e.g., an advertised business or a business selling an advertised product). As another specific example, a competitor analysis can be carried out to determine, based on characteristics of the consumers, which businesses consumers view as alternatives and characteristics of consumers that visit or purchase goods or services at each business.

In embodiments, any suitable queries may be submitted by market researchers 230 to yield inferences and predictions from the consumer analytics engine 208. In some embodiments, access to information stored by the platform 200 may be limited to only queries for inferences and predictions, rather than to data collected about individual consumers, due to privacy concerns. Raw information about each consumer 202 (e.g., raw location data not yet analyzed) or information that could identify individual consumers 202 rather than classes of consumers 202 may be confidential and may be appropriately secured for privacy. In embodiments, consumer privacy can be protected by limiting access for a researcher 230 of the platform 200 to querying and receiving the inference/prediction output of the consumer analytics engine 208, rather than examining data about individual consumers 202. Further, some embodiments may provide information about groups of consumers 202, rather than information about individual consumers 202, or may provide characteristics information in a way that cannot be linked to an individual. Such a system enables maintaining confidentiality of the identity of consumers 202 and the raw data stored in the consumer location data facility 204.

Information about consumers 202 may be used by the platform 200 not only in response to queries by market researchers. Additionally or alternatively, in some embodiments a real-time detection facility 128 may react in real time to inferences/predictions about consumers as the information about consumers is obtained or determined through analysis. The real-time detection facility 128 may react to the information by issuing a real-time response to any suitable party. The party may include a consumer 202, an organization, and adjustable advertisement, among others. The real-time response may be, for example, a delivery of an advertisement or message to the consumer 202 regarding a topic in which the consumer 202 may be interested, based on inferences or predictions regarding the consumer 202 at that time. For example, if the consumer 202 is detected to be visiting particular types of stores and the consumer analytics engine 208 may predict that the consumer 202 will soon try to find a restaurant, the real-time detection facility 128 could present information to the consumer 202 to encourage the consumer to visit a particular restaurant. In another example of a real-time response, information about consumers 202 may be presented to an adjustable advertisement such that the advertisement can be adjusted to suit the consumer 202 as the consumer 202 passes by the advertisement. Information about a consumer 202 can also be provided to a business in response to a consumer 202 visiting the business or interacting with the business. For example, discount coupons for the consumer 202 or information about the consumer 202 that could be used in negotiation with the consumer 202 over a sale may be presented to the organization. These discount coupons or information about the consumer 202 may be presented at any suitable time, including when the consumer 202 first visits an organization or when the consumer 202 begins a purchase at a point of sale.

The consumer analytics platform 200 may be used to obtain location data regarding a consumer and, from the location data, determine characteristics of consumers. These characteristics can be used to produce inferences and predictions regarding the consumers, such as in response to consumer analytics studies requested by market researchers on behalf of businesses. In this way, in some embodiments consumer analytics can be determined based on location data obtained for consumers as the consumers move and engage in activities at various locations.

Figure 3:
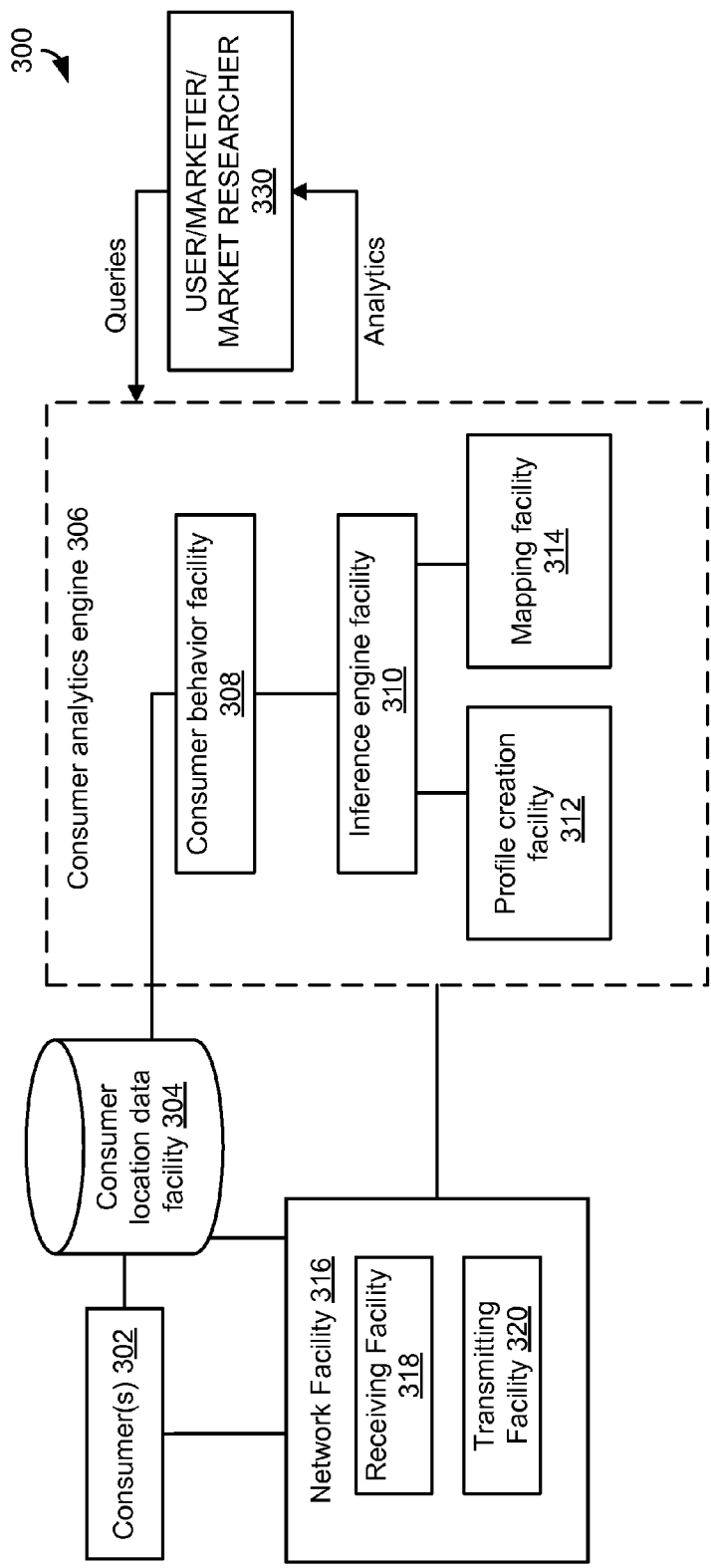
FIG. 3 is a block diagram of a second exemplary system that may analyze location data as part of a consumer analytics platform.

Various techniques that may be carried out by the components of a consumer analytics platform like the one described above are described in greater detail below in connection with FIGS. 5-9. However, it should be appreciated that embodiments are not limited to operating with the platform 200 of FIG. 2 or with any particular type of consumer analytics platform. Other platforms are possible. FIG. 3 illustrates another exemplary platform 300 with which some embodiments may operate.

FIG. 3 illustrates a second consumer analytics platform 300 and shows entities that may interact in the consumer analytics platform 300. The platform 300 is similar in some ways to the platform 200 illustrated in FIG. 2 and discussed above. Accordingly, operations of the components of the platform 300 may be described in the context of corresponding components in the platform 200 of FIG. 2.

In the platform 300, an entity for obtaining location data for consumers is separate and distinct from an entity for analyzing location data to determine characteristics and producing inferences and predictions based on the characteristics. More particularly, the consumer location data facility 304 may be provided with location data regarding consumers 302 by a network facility 316 that is operated by one entity. The consumer location data facility 304 may then provide location data to another entity that operates the consumer analytics engine 306. As discussed below, the entity operating the network facility 316 and the entity operating the consumer analytics engine 306 may cooperate to obtain location data for consumers and analyze that location data.

The platform 300 includes one or more consumers 302, a consumer location data facility 304, a network facility 316, and a consumer analytics engine 306. As the consumer 302 moves about and visits a number of settings at different geographic locations, data relating to each geographic location visited by the consumer 302 may be gathered using network facility 316 and the consumer location data facility 304.

Location data may be stored in the consumer location data facility 304 in any suitable manner, as embodiments are not limited in this respect. In some cases, one or more location data points for a consumer 302 may be stored in the facility 304 and may be associated with an identifier for the consumer 302. The identifier that is used may be any suitable identifier, including ones that anonymize or attempt to anonymize the location data by making the location data difficult to match to an individual. For example, a mapping table may be maintained in the consumer location data facility 304 that provides one-to-one association between a unique identifier of a consumer 302 with the most recent location data for the consumer 302. The unique ID that is used in the mapping table may be an International Mobile Equipment Identity (IMEI) of an electronic system accessed by the consumer, a unique Personal Identification Number (PIN) assigned by the network operator of the consumer, or some other type of identifier.

The consumer location data facility 304 implemented in the platform 300 in any suitable manner that allows for location data to be communicated to other entities. In some embodiments, the consumer location data facility 304 may be located in a server that may also include the consumer analytics engine 306, such that the consumer analytics engine can obtain location data locally by querying a data store on the same machine. In other embodiments, the consumer data location facility 304 may be installed in electronic devices associated with the consumers 302. The consumers 302 may each be associated with electronic devices that include location-identifying capabilities. The electronic devices may be, for example, location-aware mobile telephones, GPS-enabled tracking devices, personal navigation devices, in-car navigation devices, and the like. In still other embodiments, the consumer data location facility 304 may be installed in equipment of a network facility 316 operated by a network operator. The network operator may provide network services to the consumer 302. The network facility 514 may be a network setup such as a Public Land Mobile Network (PLMN) or other wireless wide area network (WWAN) deployed by a mobile network operator.

Regardless of where the consumer location data facility 304 is located or which entity manages the facility 304, location data for a consumer 302 may be provided to the consumer location data facility 304 and the location data may be provided from the consumer location data facility 304 to a consumer analytics engine 306. In some embodiments, location data for consumers 302 may be obtained in real time, meaning that as a consumer 302 moves the location of the consumer 302 is continuously updated in the consumer location data facility 304. In other embodiments, the location data may be stored in the consumer location data facility 304 at discrete times and made available for later use. In embodiments that obtain location data for a consumer 302 discretely (rather than continuously), the location data may be obtained at any suitable interval or in response to any suitable condition. In some embodiments, the location data may be obtained in response to receipt of a location data request from the consumer analytics engine 306 may transmit a location data request to the consumer's electronic system. The location data request may include a request for current location of the consumer 302 that identifies the consumer 302 according to the identifier used by the mapping table of the consumer location data facility 304 (e.g., the IMEI).

The location data request may be received by the network facility 316 or conveyed to the network facility 316 by the consumer location data facility 304. In embodiments where the network facility 316 is managed by a mobile network operator and is associated with a mobile network, the location data request may be received by the network facility 316 via an interface designated for requesting and transmitting location data. In some cases, the interface may be an interface associated with an Enhanced 911 (E911) system. The E911 system allows for retrieval of location data for mobile phones during emergency situations, but network operators are able to make this interface available for other situations and can do so in these embodiments.

The location data request, when received by the network facility 316, may be forwarded to a receiving facility 318 residing in the network facility 316. The reception of the location data request may trigger a transmitting facility 320 in the network facility 316 to initiate a transmission to location-determination hardware, such as Global Positioning System (GPS) hardware, in the electronic device of a consumer 302 for whom the location data was requested.

The electronic device may identify location using any suitable technique, including various techniques known in the art. Using some techniques, the electronic device may determine the location alone and transmit the determined location data to the network facility 316. Using other techniques, the network facility 316 may cooperate with the electronic device to determine the location data. Techniques that may be used include cell identification, enhanced cell identification, Uplink-Time difference of arrival, Time of arrival, Angle of arrival, enhanced observed time difference (E-OTD), GPS, Assisted-GPS, hybrid positioning systems, Global Navigation Satellite System (GLONASS), the Galileo navigation system, location-determination services using access points for wireless local area networks (WLANs), and the like. In embodiments, the location data may additionally or alternatively be obtained using paging, triangulation, and the like.

Using these or other techniques, the electronic device and the network facility 316 may acquire geographic information identifying a current location of the consumer 302, such as latitude and longitude of the current location of the consumer 302. The geographic information, along with a corresponding time frame and an error margin for the geographic information (collectively referred to as "location data"), may be stored in the consumer location data facility 304 along with an identifier for the consumer 302. The location data may then be made available to the consumer analytics engine 306 by the consumer location data facility 304, including being transmitted to the consumer analytics engine 306.

In embodiments, the consumer analytics engine 306 may receive multiple pieces of location data for the consumer 302 over time, which will be in the form of a set of data points each identifying a location through which the consumer 302 passed. As discussed above in connection with consumer analytics engine 208 of FIG. 2, the consumer analytics engine 306 may generate a unique list of physical locations visited by each consumer 302 by identifying anchors from locations that are similar in time and space and by identifying settings corresponding to these anchors. By analyzing this unique list, patterns can be identified in the settings that can be used to determine some characteristics of a consumer 302. For example, an identity, behaviors, and preferences of the consumer 302 can be identified through analysis. Additionally, personally-relevant locations for the consumer 302, such as the place of residence and place of employment of the consumer 302, can be determined through analysis.

Analysis of location data can be performed by any suitable components of the consumer analytics engine 306. As illustrated in FIG. 3, the consumer analytics engine 306 may include a behavior analysis facility 308, an inference engine facility 310, a profile creation facility 312, and a mapping facility 314. Through these and/or other components, the consumer analytics engine 306 may perform analysis of location data regarding the locations visited by the consumer 302. The consumer analytics engine 306 may also review the characteristics of the consumer and compute inferences and predictions of characteristics of the consumer 302 in response to requests to perform a study received from a market researcher 330 or other entity.

In some embodiments, the consumer analytics engine 306 may operate similarly to the consumer analytics engine 208 of the platform 200 of FIG. 2, but embodiments are not limited to generating characteristics in any suitable manner. Examples of characteristics that may be generated through this analysis include consumer lifestyle-relevant behavior inferences and retail-relevant behavior inferences based upon the outputs of the consumer behavior facility 308. In some embodiments, these behavior inferences may detect patterns in one or more manners, for example, the types of places of interest (POIs) visited by each consumer, the time of the day when the POI was visited, day of the week for the visit to the POI, seasonality and duration of each visit to a POI, the speed of travel between POIs, the regularity of each consumer's daily routine and travel, commute patterns, the frequency of visit to a particular location, an inferred nature of the trip, brand preferences, what locations are passed but not visited, and the like.

In some embodiments, characteristics determined by the behavior analysis facility 308 from the inference engine facility 310 may be provided to the profile creation facility 312. The profile creation facility 312 may be adapted to create profiles for consumers 302 based on information about the consumers 302 obtained via the location data or determined by the behavior analysis facility 308 and the inference engine facility 310. In some embodiments, the profile creation facility 312 may store in a profile only information determined by the consumer behavior facility 308 and may not perform any analysis or determination itself. In other embodiments, however, the profile creation facility 316 may detect patterns in the profile information received from other sources and may store in a profile additional information about a consumer. Profiles created for each consumer by the profile creation facility 312 may be stored in a profile data set accessible by the consumer analytics engine 306.

Profile information, once stored in a profile data set by the profile creation facility, may also be analyzed by the mapping facility 314. The mapping facility 314 may maintain information correlating profile information for consumers 302 with other information including other profile information and information relevant to organizations to which the consumers 302 could be related. The mapping facility 314 may, for example, maintain mappings between some characteristics of a consumer 302 and other information or characteristics, such that when a profile of a consumer 302 is detected to include one piece of information, a decision may be made about the consumer 302. In some embodiments, additional information may be stored in a profile for the consumer 302 upon detecting a match. For example, a further characteristic of the consumer 302 may be determined based upon a detected match in a mapping. In some embodiments, one or more actions can be taken upon determining that a consumer 302 matches a mapping.

Once characteristics for consumers 302 are determined by the consumer analytics engine 302 and stored in profiles by the profile creation facility 312, the characteristics associated with each profile may be reviewed to yield inferences and predictions. The inferences and predictions may be produced as part of determining results of a study requested to be performed by a market researcher 330. The requested study may be directed to a particular business or other topic and the inferences and predictions may generate information related to the particular business or other topic. For example, consumer characteristics related to a business may be inferred or predicted, which may include characteristics of consumers' interactions with the business and/or interactions with related businesses including competitors and businesses of the same or similar type. Consumer characteristics may include identity, behavior, and preference characteristics for consumers that are related to the business, including what types of consumers interact with the businesses, how or when the consumers like to interact with the business, or how likely particular types of consumers are to interact with the businesses in the future. As another example, information about how consumers may act in the future, given various conditions, or may react to proposed scenarios may be inferred or predicted. Examples of inferences and predictions are discussed above in connection with FIG. 2.

In the platform 300, the inference engine facility 310 may receive inputs from the consumer behavior facility 308 and may be able to read information from profiles generated for consumers by the profile creation facility 312 and location data obtained from consumer location data facility 304. The inference engine facility 310 may generate inferences and predictions for consumers, relating to the business or other topic of the study, based on the information from facility 308 and the profiles.

Thus, when market researchers 330 enter queries for studies, inferences and predictions may be generated based on location data and/or characteristics of consumers determined from the location data. When results including the predictions and inferences are received in response, the results may aid the market researcher 330 in determining the identity or characteristics of consumers, such that decisions can be made by businesses with accurate information about consumers that are existing or potential customers of the businesses.

Figures 4, 5:
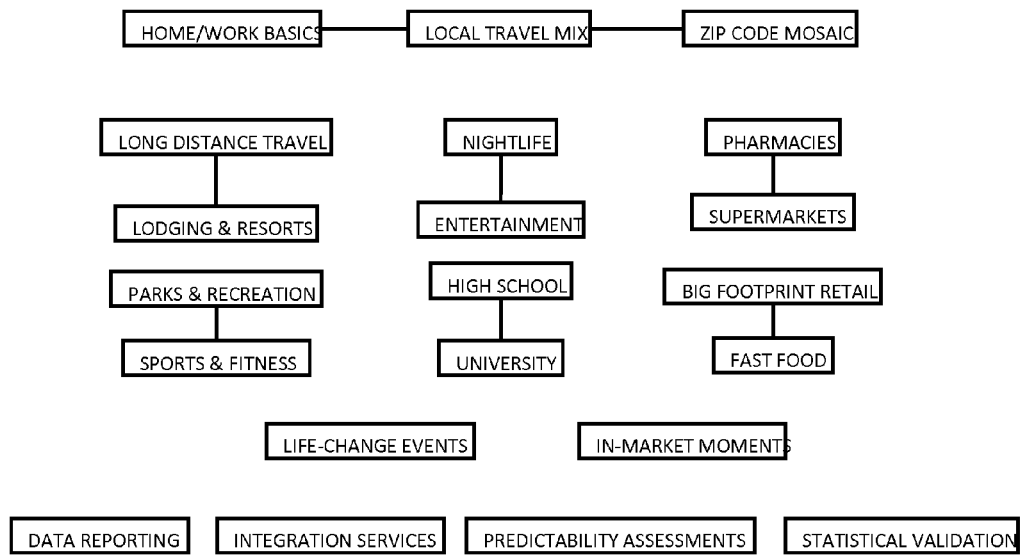
FIG. 4 illustrates a sample tag cloud of characteristics that can be determined, in some embodiments, for a consumer or group of consumers.
FIG. 5 illustrates exemplary analytics available for production by a consumer analytics platform operating in connection with techniques described herein.

Using any of the exemplary systems described above or the exemplary techniques described below, various characteristics of consumers can be determined from location data and stored in profiles for each consumer. These characteristics may include identity, behavior, and preference characteristics, among others. In some embodiments, when characteristics are determined for a consumer, a word or phrase may be associated with the consumer, such as in the profile maintained for the consumer. FIG. 4 illustrates one exemplary set of characteristics that may be determined by exemplary embodiments for a consumer and maintained in a profile. The characteristics, which may also be called "tags," that are associated with a consumer include information on an identity of the consumer, like that the consumer is a resident of Somerville, Mass., USA, and works in downtown Boston. The characteristics also include behavior characteristics, including that the consumer is a "CVS regular" and a "McDonald's Patron," and that the consumer goes to the movies on Fridays and the grocery store on Wednesdays. Preference characteristics, like that the consumer is a Celtics fan, may also be stored.

Information that is stored for each consumer may be queried by market researchers or others in any suitable manner. In some embodiments, market researchers and others may be able to navigate a menu system relating to characteristics of consumers or services that can be offered that use information relating to characteristics of consumers. FIG. 5 illustrates one exemplary menu of categories of information that may be provided by a consumer analytics engine, including links between categories that are related. By selecting any of the boxes in the top portion of FIG. 5, information about characteristics of consumers can be determined. Services rendered by a consumer analytics engine can be triggered by using any of the boxes along the bottom line of the menu of FIG. 5. For example, reports can be generated or predictions can be offered on consumers by selecting appropriate boxes in the menu of FIG. 5.

Illustrative Techniques

Described above are various systems and platforms for analyzing location data to determine characteristics of a consumer, as well as some exemplary types of characteristics that can be determined. Discussed below are exemplary techniques that may be carried out in some embodiments to obtain location data, determine characteristics of consumers based on the location data, and infer and predict other characteristics in response to a request to perform a study. Embodiments are not, however, limited to carrying out any of the exemplary techniques described below, as others are possible.

Figure 6:
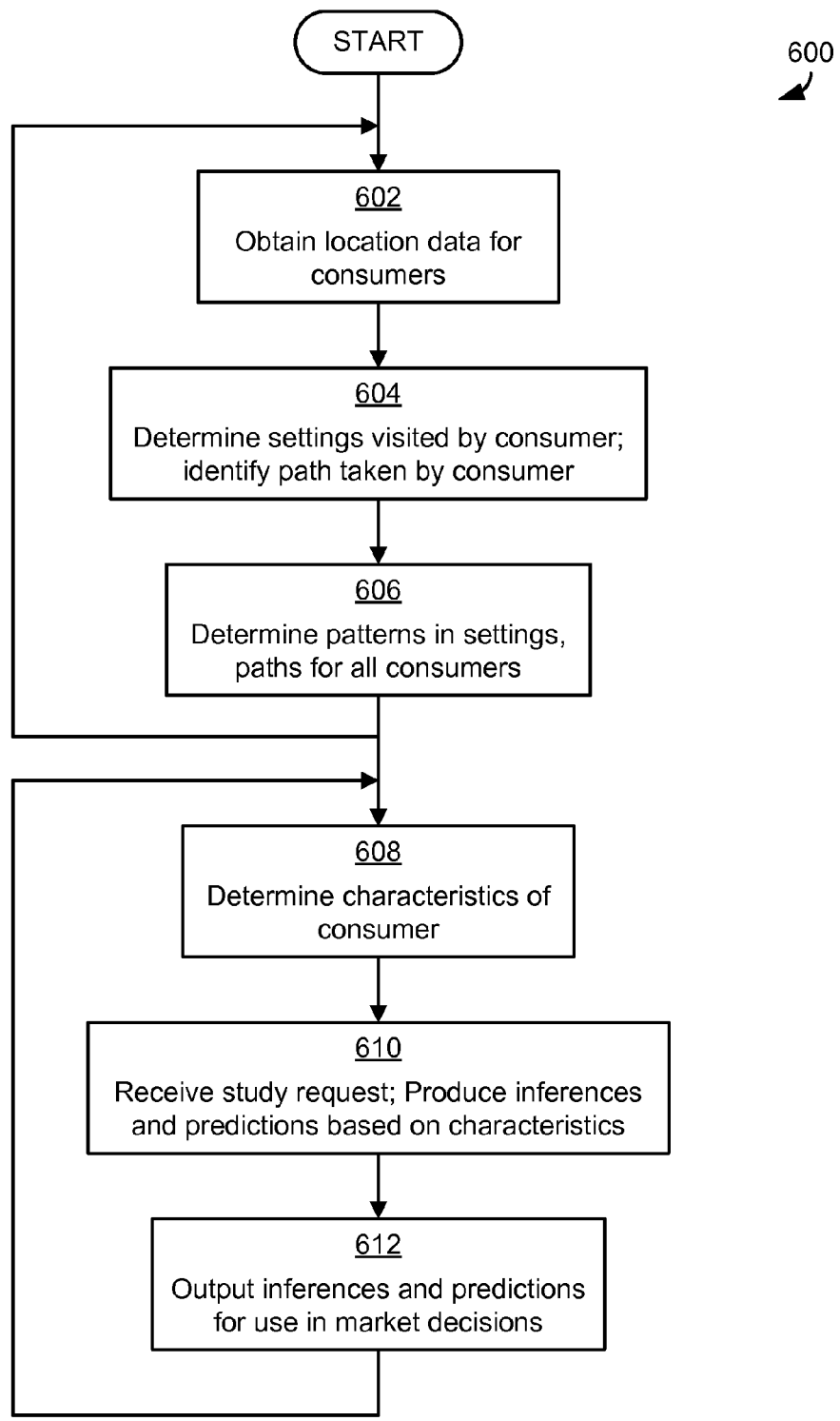
FIG. 6 is a flowchart of one exemplary process for analyzing consumer behavior based on location data.

FIG. 6 illustrates one example of an overall process for determining characteristics of consumers and using those characteristics in making market decisions for businesses.

The process 600 of FIG. 6 begins in block 602, in which location data is obtained for a consumer. Any suitable location data may be obtained for the consumer, including geographic data identifying a current location, a margin of error that identifies the precision the geographic data, and time data identifying a time the geographic data was obtained. The geographic data may be any type of information identifying a location of a consumer, including a latitude/longitude, a street address, a placement in a building, or other location data.

The location data may be obtained in part using an electronic device associated with a consumer, such as a device carried by the consumer or integrated into an item associated with the consumer (e.g., integrated into a car, baggage, or clothing). The electronic device may obtain location data or be used in obtaining location data, and the location data may then be transmitted to a consumer analytics platform at any suitable time and in any suitable manner. In some embodiments, the electronic device may continuously or occasionally transmit location data for the consumer to a consumer analytics platform, while in other embodiments the consumer analytics platform may occasionally request location data from the electronic device and the electronic device may transmit the location data upon receipt of the request.

Once the location data is obtained by the consumer analytics platform, the location data may be processed and analyzed in various ways to determine characteristics of a consumer. In block 604, the locations visited by a consumer may be compared to known geographic locations to determine settings visited by a consumer. The settings may be personally-relevant locations known to be associated with the consumer, such as a place of residence or employment, or known points of interest (POIs) that can be visited by consumers. These settings visited by a consumer may be identified by first identifying, from the raw location data, a group of geographic locations at which a consumer stopped. The geographic locations at which a consumer stopped are referred to as anchors herein. When a set of anchors visited by a consumer has been determined from the location data, the set may be analyzed to determine a path taken by the consumer. A path is a trip taken by a consumer that includes settings, bound by two endpoints and possibly including intermediary points. The two endpoints of a path are settings at which a consumer spends a lot of time and that a consumer would consider a final destination of a trip, which could be personally-relevant locations for the consumer, like a place of residence and a place of employment. Once endpoints have been determined in a set of anchors visited by a consumer, paths may be identified between the endpoints that, based on the set of anchors and the actual route taken by the consumer, may include zero, one, or more anchors as intermediary points of the path. From examining the types of settings that correspond to each anchor visited on a path, the types of settings that correspond to the endpoints for the path, or other properties of the path, a purpose of a path may be determined. The purpose of the path may be the consumer's reason for traveling to and between the settings corresponding to the anchors. Some or all settings corresponding to the anchors may be associated with categories or descriptions that identify a consumer's reason for visiting the setting, which could provide insight into the purpose for the path. For example, if a consumer visits a number of clothing stores during a path, the consumer may have been shopping for clothes. If the consumer visits a number of stores of different types during the path, the consumer may have been on a generic shopping trip. If the consumer visited a number of public parks, museums, landmarks, etc., then the consumer may be determined to have been recreating.

When anchors, settings, and paths have been determined from the location data, the anchors and paths can be analyzed to determine characteristics of the consumer that visited the settings and traveled the paths. As discussed above, determining characteristics of the consumer includes determining attributes of a consumer's identity, behaviors, and preferences. At least some of these characteristics may be determined from detecting and analyzing patterns in the settings and paths determined in block 604. Accordingly, in block 606, the settings and paths are analyzed to determine patterns. These patterns may be detected in any suitable properties of the settings and paths. These patterns may include patterns in particular settings visited, types of settings visited, times the settings were visited, frequency of visits to settings or types of settings, settings or types of settings visited together in paths, lengths of paths, frequency of paths with particular purposes, and other patterns.

The patterns that are detected in block 606 may be patterns for a particular consumer or patterns for all consumers, based on analyzing together the location data, settings, and paths of the consumers. Patterns in settings and paths between consumers may then be determined and could be used to better understand individual consumers and determine characteristics of individual consumers.

The process 600 continues obtaining location data in block 602 and analyzing the location data in blocks 604 and 606. Additionally, the results of the analysis of block 606 can be used in block 608

In block 608, the patterns detected for a particular consumer or for all consumers are used to determine characteristics of the particular consumer. The characteristics of the consumer can be determined in any suitable manner, including by analysis, inference, and prediction. In some cases, for example, by analyzing the settings, paths, and patterns, some characteristics of the consumer can be identified. For example, by determining that a likely place of residence for a consumer is in Somerville, Mass., USA, a consumer analytics platform may determine the identity attribute "Resident of Somerville, Mass." As another example, by noting that the consumer visits many gyms and public parks, the consumer analytics platform may determine that the consumer is interested in physical fitness. As another example, by noting that the consumer visits one chain of grocery stores exclusively, the consumer analytics platform may determine that the consumer prefers that grocery store over others.

Once characteristics of each of multiple particular consumers are determined from the analysis of the settings and paths, the characteristics may be used by market researchers to make market decisions. In block 610, a request to perform a study of consumer characteristics for a particular business or other topic is received. The request may be received from a market researcher seeking to know more about consumers as they relate to the particular business or other topic. In response to receiving the request to perform the study, characteristics related to the multiple consumers may be retrieved and analyzed with respect to the particular business or other topic. For example, consumers' past interactions with the particular business, with other businesses of the same type, of other businesses in a same geographic area as the particular business, may be evaluated. Based on these past interactions by multiple consumers, inferences and predictions can be produced. For example, inferences can be drawn regarding current characteristics of groups of consumers with respect to the particular business, including identities of consumers who do and do not interact with the business, behaviors of consumers in interacting with the business, and preferences of consumers with respect to the business. Similarly, predictions can be made about future characteristics of groups of consumers with respect to the particular business. As another example, information regarding what consumers may do given one or more conditions or how consumers may react in each of one or more proposed scenarios may be generated as a prediction or inference.

These inferences and predictions may be generated in any suitable manner, including using machine learning algorithms as discussed above.

Any suitable future or current characteristics of consumers with respect to a business can be produced as an inference or prediction in block 610. For example, by determining the places of residence and employment and travel patterns for consumers that are customers or are potential customers of a business, the business can determine a good place to locate a store. In some cases, potential locations for businesses can be evaluated to determine potential numbers of consumers that would visit each potential location, as part of determining which location is best. As another example, by determining characteristics of consumers, the business can determine an advertising campaign to undertake. Similarly, by detecting consumers that passed through a location associated with an advertisement for a business and then visited the business or visited the business in a different way than previously (different frequency or different time interval), an inference regarding the effectiveness of the advertising campaign can be made. As another example, by examiner interactions of consumers with particular sets of businesses of a particular type, competitors to a particular business can be inferred. Once competitors are identified, decisions can be made regarding how to attract consumers away from competitors.

In block 612, after inferences and predictions are produced regarding characteristics of consumers with respect to a business, the inferences and predictions can be output as results of the study requested in block 610. The inferences and predictions can then be used to make market decisions for the particular business that was the topic of the study.

After the characteristics to be used in marketing decisions are output in block 612, the process 600 continues determining new characteristics in block 608 and using the new characteristics in marketing decisions in block 612.

Figure 7:
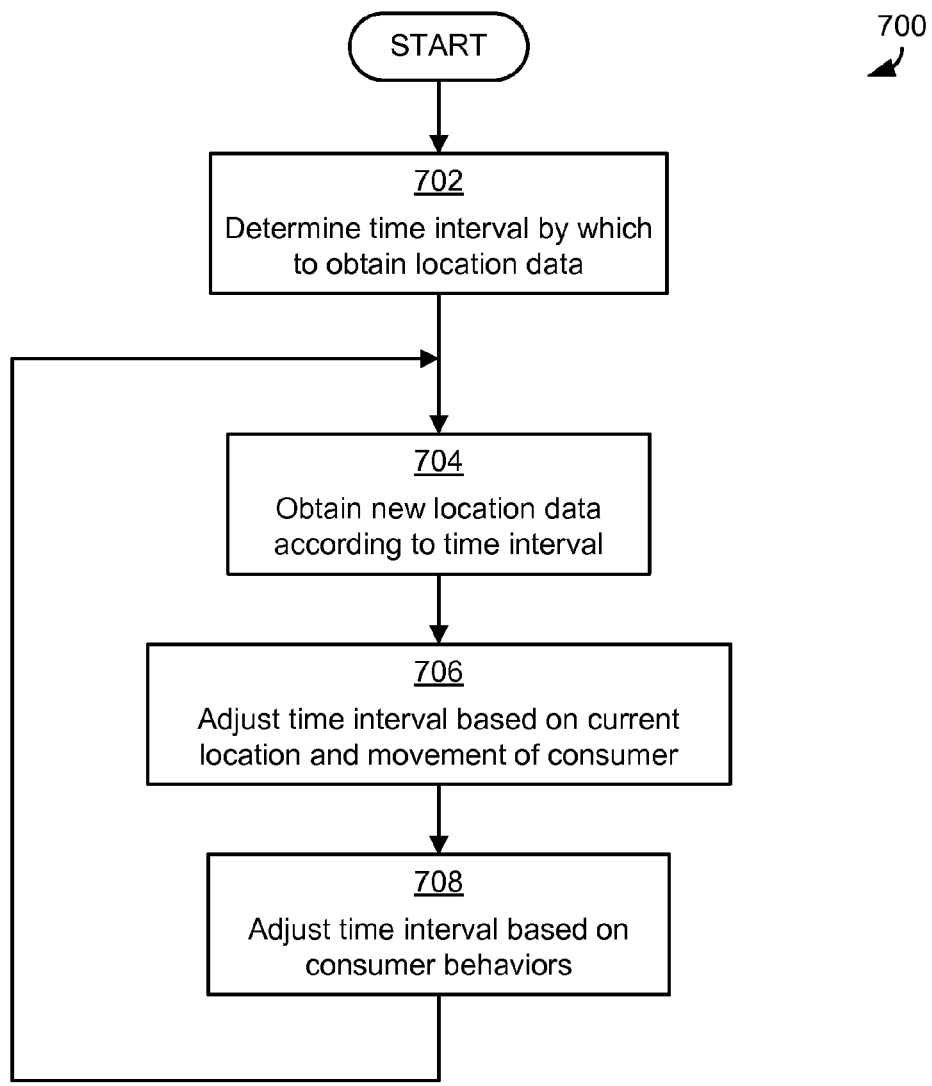
FIG. 7 is a flowchart of one exemplary process for obtaining location data for a consumer.
Figure 8:
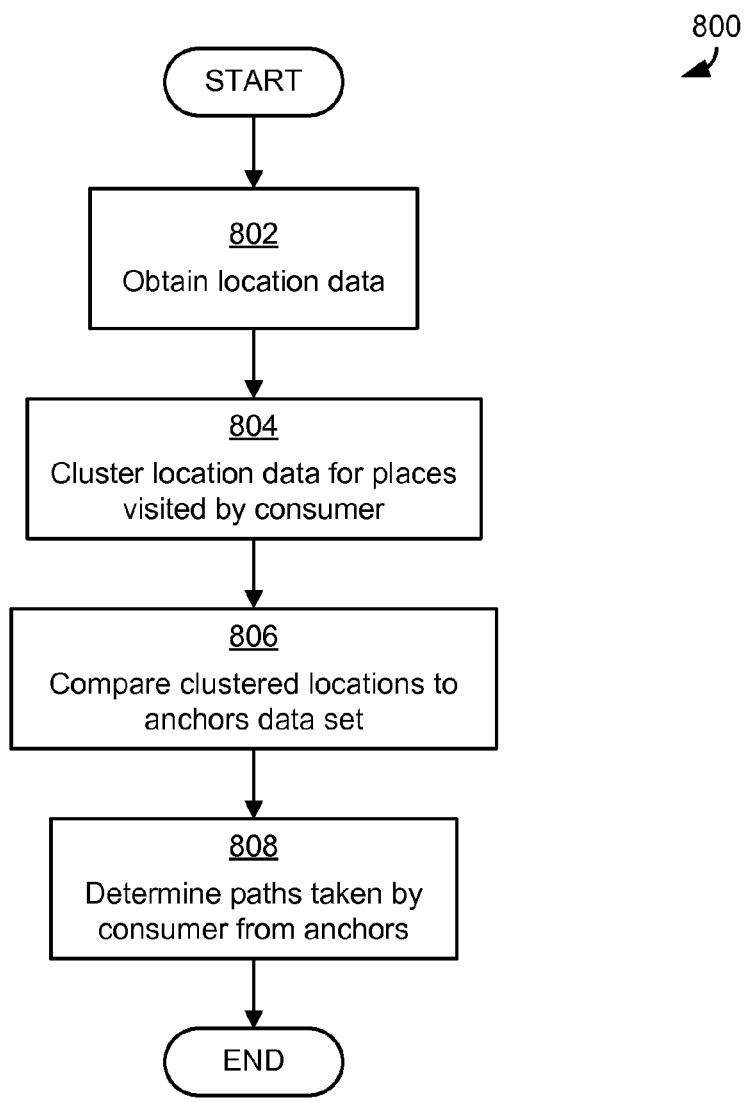
FIG. 8 is a flowchart of one exemplary process for identifying a trip taken by a consumer based on location data.
Figure 9:
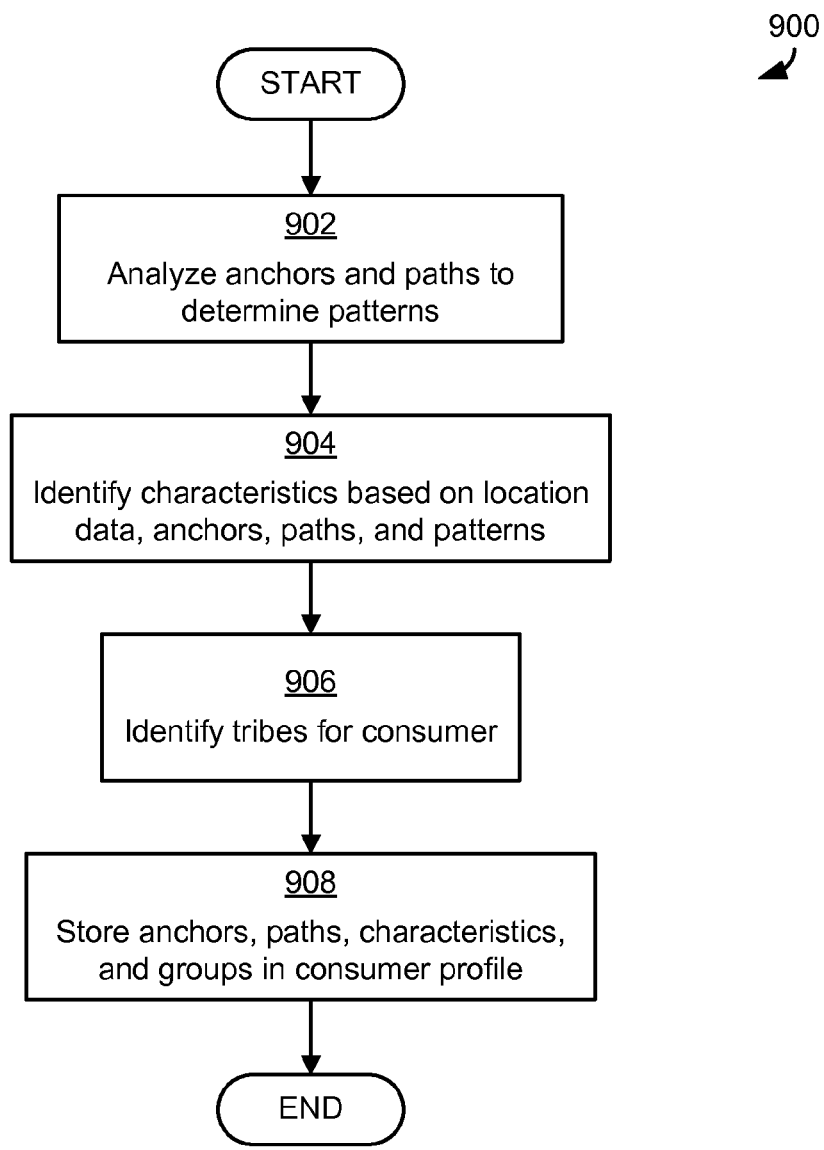
FIG. 9 is a flowchart of one exemplary process for identifying characteristics of a consumer based on path information.

FIG. 6 describes generally a process that can be carried out for determining and using characteristics of consumers through obtaining location data for the consumers. FIGS. 7-9 show specific processes that can be implemented in some embodiments for carrying out some of the tasks described generally in connection with FIG. 6.

In some embodiments, location data may be transmitted from an electronic device associated with a consumer to a consumer analytics platform after a time interval, or may be requested by the consumer analytics platform after a time interval. The time interval can be any suitable interval useful for monitoring movements of a consumer. In some cases, the interval may be fixed, while in other cases, the interval may be adjusted.

FIG. 7 illustrates one example of a process for adjusting a time interval by which location data is obtained. These techniques may be used by an electronic device determining when to transmit location data and/or by a consumer analytics platform determining when to request location data, or may be used by any other entity.

The process 700 of FIG. 7 begins in block 702, in which a time interval by which to obtain location data is first determined. The time interval determined in block 702 may be a default time interval that is used for consumers when time intervals are first being determined or may be a time interval related to the consumer in some way. In cases where the consumer analytics platform does not have information about a consumer, such as where the consumer is first being tracked, a default time interval may be used. In cases where information is available about the consumer, however, a time interval may be determined in block 702 based at least in part on information about the consumer. For example, if the consumer is known to move frequently, the time interval may be shorter than if the consumer did not move frequently. In cases where the consumer moves frequently at some times and less frequently at other times, a length of the time interval may be determined in part by a time the determination is made. For example, a short time interval can be used when the consumer can be expected to be moving and a long time interval can be used when the consumer can be expected not to be moving.

Regardless of the time interval selected in block 702, in block 704 new location data is obtained by the consumer analytics platform according to the time interval. In some embodiments, the new location data may be obtained when an electronic device associated with a consumer detects expiration of the time interval, determines a current location of the consumer, and transmits location data to the platform. In other embodiments, the platform may detect expiration of the time interval and request location data. In any case, location data is obtained by the consumer analytics platform according to the interval.

In block 706, the new location data obtained in block 704 is used to adjust the time interval by which location data is obtained. This may be done so as to produce more information about a location of a consumer when more accurate information would be useful and produce less information about a location of a consumer when accurate information is not as useful. In block 706, this adjustment is made according to the current location and movement of a consumer. The current location may be determined based on the new location data received in block 704 and the movement of the consumer may be determined by comparing the new location data to previously-received location data. Movement information for the consumer may include information on a speed and direction of movement of the consumer.

To adjust the time interval, a current location and movement of the consumer may be compared to anchors associated with known settings, including points of interest (POIs), to determine whether the consumer is at or approaching a setting. If the consumer is at a setting, then the time interval may be decreased so that more location data is obtained while the consumer is at the setting and an accurate length of time that the consumer spent at the setting can be determined. If the consumer is near a setting, then a movement of the consumer may be evaluated to determine whether the consumer is moving toward or away from the setting. If the consumer is moving toward the setting, then the time interval may be decreased such that whether the consumer visited the setting can be accurately determined. On the other hand, if the consumer is moving away from the setting, then the time interval may be lengthened. In some cases, when previous location data for a consumer was last obtained more than a threshold time ago, it may be difficult to determine accurately a current movement of the consumer. In such cases, when a consumer is detected to be near a setting, another piece of location data may be quickly obtained and used to determine accurately a movement of a consumer.

In block 708, behaviors of a consumer may also be used to adjust a time interval. For example, current behaviors of the consumer inferred from the consumer's location as well as past behaviors engaged in by the consumer may be used to adjust the time interval. If a consumer is determined from the location data to be at work, and the consumer typically does not leave work during the day, then a time interval may be left unchanged or increased such that fewer pieces of location data are collected while the consumer is at work and not moving. Similarly, if the same consumer is detected to be on a highway on the way to work, the time interval may be increased for the same reason, before the consumer reaches work, based on the knowledge about the consumer's anticipated behavior. On the other hand, if the same consumer is detected to be at work and the current time is near the end of the consumer's typical work day, the time interval may be decreased such that location data may be captured that accurately portrays the movements of the consumer after work.

After the time interval is adjusted based on the location and movement of the consumer and consumer behaviors, the process 700 returns to block 704 and obtains new location data based on the adjusted interval. The process 700 then continues with obtaining location data and adjusting time intervals.

In some embodiments, rather than only increasing or decreasing a time interval in blocks 706 and 708, a time interval may be left unchanged based on an evaluation of the location, movement, and behavior of the consumer.

Further, while in some embodiments a time interval may be freely adjusted and may be decreased to as small an interval as possible, in other embodiments limits may be set on the time interval. In some embodiments, for example, an electronic device used to obtain location data for the consumer may be battery powered, such as a battery-powered mobile phone of the consumer. In these cases, a limit may be imposed on a length of the time interval to prevent location data from being obtained very frequently using the electronic device, which may run down the battery on the electronic device. This limit may be a limit on how short a time interval can be. For example, limits may be used such that the time interval must be longer than one minute or longer than five minutes, though any suitable limit may be used.

As discussed above, once location data is obtained describing movements of a consumer, the location data can be analyzed in various ways to determine characteristics for consumers. One way in which the location data can be analyzed is by contextualizing the location data. The location data can be contextualized by identifying settings visited by a consumer (e.g., points of interest (POIs)) and paths taken by a consumer that include the settings.

FIG. 8 shows one exemplary process 800 for identifying settings and paths. Process 800 begins in block 802, when location data is obtained identifying locations through which the consumer passed. As discussed above, the location data may include geographic data, a margin of error for geographic data, and time data.

Multiple pieces of location data may be obtained in block 802. These pieces of location data may not correspond to different places visited by a consumer, however. If a consumer spends a long time shopping at a store, for example, multiple pieces of location data may be obtained for the consumer while the consumer is in the store. Each of those multiple pieces of location data may therefore relate to the same place.

In block 804, location data for places visited by a consumer is clustered such that similar location data is grouped together to identify anchors. This clustering may include clustering based on similarity in space and/or in time, which may be done using thresholds to identify similarity in space and/or time. For example, two pieces of location data that indicate geographic locations within 400 feet of one another may be clustered. In some cases, these thresholds may be adjusted based on the error margin of location data points. For example, a threshold distance for clustering may be greater when the error margin of associated location data points is larger. Additionally or alternatively, in some cases, these thresholds may be adjusted based on a location and/or movement of a consumer. For consumers in New York City, for example, a threshold distance for clustering may be smaller than for consumers in Wyoming. Similarly, if a consumer is moving slowly (e.g., walking) then a threshold in time may be shorter than if a consumer is moving quickly (e.g., driving on a highway). Once pieces of location data are clustered to identify anchors, a calculation may be performed to identify attributes for an anchor. For example, an average location of the geographic location of the multiple pieces of location data can be determined, as can an average time, beginning time, end time, duration, aggregated error margin, or other location attributes.

In block 806, a comparison is made of clustered locations for anchors to a data set of settings. The data set of settings may include information about settings at which a consumer may stop. Settings include known points of interest (POIs) like known stores, restaurants, offices, etc., as well as personally-relevant locations for a consumer like places of residence and employment. Each setting may be associated with a location and a consumer may be detected to have visited a setting when the location for an anchor matches a location for a setting. As discussed above, a location for a setting may be defined by a point and a threshold radius or as a polygon with marked edges and a consumer may be detected to have visited the setting when the location data (or a location within the margin of error indicated by the location data of the geographic location indicated by the location data) falls within the radius or the polygon. As discussed above, when a location potentially matches multiple settings (e.g., when the location, with the error margin, matches multiple settings) information about locations and/or consumers may be used to determine to which setting the location corresponds. For example, Bayesian Network techniques like Hidden Markov Models may be used, as discussed above in connection with FIG. 2.

From the comparison in block 806, a set of settings visited by a consumer may be identified. The settings may be identified based on a sequential order in which the settings were visited from the time data included in the location data obtained for the consumer.

In block 808, from the settings identified in block 806, paths may be identified. As discussed above, a path includes two endpoints and may include intermediary points. Endpoints of the path are settings that a consumer would consider a final destination of at trip, including personally-relevant locations. For example, endpoints may be places of residence or employment for the consumer. Intermediary points may be settings of the sequence that are visited between endpoints. By analyzing the sequence of settings identified in block 808, endpoints can be identified and paths can be identified based on the endpoints.

In some embodiments, determining a path may also include determining a purpose for the path. A purpose for a path may be determined through analyzing settings visited on the path, including types of settings visited on the path. The types of settings visited by a consumer may indicate a purpose of the consumer in taking the path, including generic shopping, shopping for a specific item, or recreation.

Once paths are identified, the process 800 ends. The paths and settings that are identified can then be analyzed to determine characteristics of the consumer, including to identify identity, behavior, and preference attributes for the consumer. For example, by analyzing settings visited by a consumer, brand loyalties or behavior patterns can be determined for the consumer.

FIG. 9 shows one example of a process for determining characteristics of a consumer. Prior to the start of process 900 of FIG. 9, location data has been obtained for locations visited by a consumer and analyzed to determine settings and paths visited by the consumer. In the process 900, patterns in settings and paths visited by a consumer and by other consumers are identified and used to determine characteristics of a consumer.

The process 900 can be carried out using results of any suitable machine learning technique. In some cases, a machine learning technique may review information about consumers, settings, and paths and identify relationships between pieces of information. Some relationships that may be identified include patterns.

The process 900 begins in block 902, in which settings and paths of a consumer are analyzed to determine patterns. Patterns that may be detected for settings are discussed above in connection with the anchor analysis facility 212 of FIG. 2. Such patterns include patterns in settings visited, in types of settings visited, in times that settings or types of settings were visited, and lengths of time spent at a setting, among others. Patterns that may be detected for paths are discussed above in connection with the path analysis facility 214 of FIG. 2. Such patterns include patterns in lengths of paths, in purposes of paths, in times paths of a particular purpose were taken, in settings that are visited together in paths or not visited together in paths, and in lengths of time between paths of a particular purpose, among others.

In block 904, characteristics are determined for a consumer based at least in part on an analysis of the location data, settings, and paths, as well as on the patterns identified in block 902. Determining characteristics of a consumer may be carried out in any suitable manner. For example, some information that is merely factual or can be distilled from the information may be determined through the analysis of block 904. These characteristics may include identity characteristics, like that the consumer often drives on highways or is often near a particular type of setting (e.g., a particular chain of stores). As another example, behavior information like that the consumer visits a particular coffee shop nearly every day may be determined from the analysis. Characteristics may also be deducted from the available information. Such deduction may be used to determine characteristics that cannot be identified with certainty from pure analysis. For example, if the consumer visits a coffee shop nearly every day, it can be deduced that the consumer drinks coffee. However, this cannot be known with certainty because the consumer may visit the coffee shop for some reason other than to drink coffee. As another example, if the consumer spends many hours nearly every night in a single location, a system may deduce that the consumer lives in that location. In another example, if the consumer often visits gyms and public parks, that the consumer is an athletic person or a person with an active lifestyle may be deduced. Similarly, if the person often visits sports venues and sports bars, the consumer may be deduced to be someone interested in sports. When such deduction is used, the deduction may be associated with a likelihood that the deduction is correct. This likelihood may be related to a strength of a relationship identified by a machine learning algorithm used in making the deduction. A strength of a characteristic may also be determined, such as by how often the consumer exhibits the characteristic or on what data the characteristic is based.

In block 906, the information available about the consumer is analyzed to determine one or more tribes to which the consumer belongs. As discussed above, a tribe is a group of consumers sharing particular characteristics. Each tribe may be defined by a set of one or more characteristics and when a consumer matches those characteristics, the consumer may be determined to be a part of the tribe. Examples of tribes are given above in connection with the discussion of the tribal clustering facility 222. Such examples include a home-oriented tribe for people who are often at home; a work-oriented tribe for people who are often at work; a commuter tribe for consumers who travel long distances between home and work; "early riser" and "late-riser" tribes dependent on when a consumer leaves their home for the day; a nightlife tribe for consumers who are often out late at night; and an "active lifestyle" tribe for consumers who are detected to be partake in athletic activities (e.g., visit gyms and public playing fields). Other tribes are possible.

In block 908, information about anchors and paths for the consumer, characteristics determined in block 904, and the tribes identified in block 906 are stored in a profile for the consumer in block 908. Storing the information in a profile allows for the information to be retrieved later, such as upon receipt of a request from a market researcher to perform a study on data managed by a consumer analytics platform, as discussed above in connection with FIGS. 2, 3, and 6. In some cases, storing the information in block 908 may include editing or removing information previously stored in the consumer profile. For example, if a first characteristic is determined for a consumer at a first time, and at a later time a second, conflicting characteristic is determined for the consumer at a second time, the first characteristic may be removed or edited. In some other cases, the first and second characteristics may be merged in some way, or the first characteristic may be refined based on the second characteristic. In some embodiments, how the first and second characteristics are handled may be based on a relative likelihood that the characteristics are correct or other strength of the characteristics, such that whichever characteristic is stronger is the characteristic maintained in the database.

Once the information is stored in block 908, the process 900 ends. After this process, further location data may be obtained and the process 900 may be again carried out to refine or correct characteristics determined in block 900. Additionally, market researchers may query the profiles to determine answers to questions they have about markets for particular products, services, or businesses.

While not illustrated in the example of FIG. 9, as discussed above in some cases characteristics may be determined based on purchase data and/or demographic data, in addition to location data. Embodiments that review purchase data and/or demographic data may do so in any suitable manner, including as in the examples described above.

Figure 10:
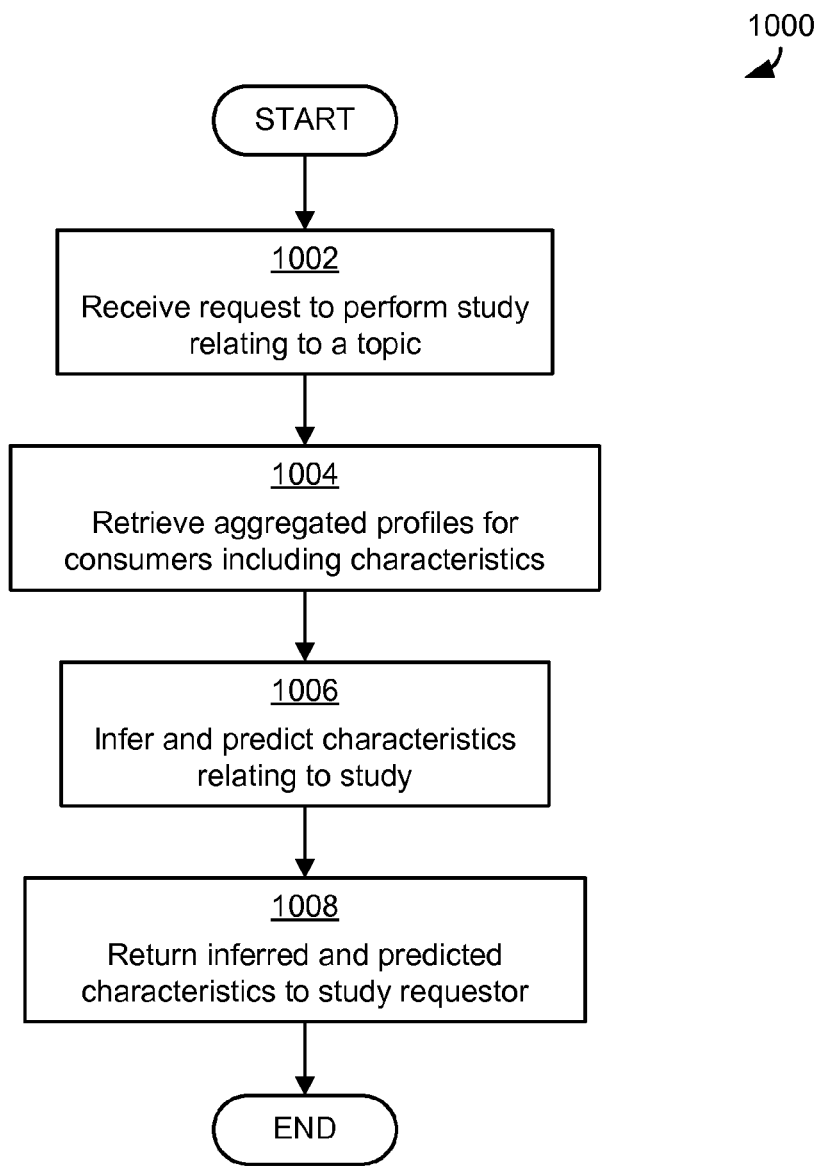
FIG. 10 is a flowchart of one exemplary process for interpreting consumer profile data to yield inferences and predictions in connection with a study requested by a market researcher.

FIG. 10 illustrates one exemplary process that may be used for performing a study on characteristics of consumers related to a particular topic, such as a particular business. Prior to the process 1000 of FIG. 10, location data for multiple consumers may be obtained and analyzed to determine characteristics for the consumers. The characteristics for the consumers may be stored in profiles for each consumer. The profiles may be used in the process 1000, in aggregate, to determine the characteristics of consumers with respect to the particular topic.

Process 1000 begins in block 1002, in which a request to perform a study relating to a topic is received by a consumer analytics platform. The request to perform the study may indicate any suitable constraints or desired outputs of the study. For example, a particular topic of the study and may include desired characteristics for consumers to be determined as part of the study. Additionally, in some cases the request may include characteristics of consumers to be considered as part of the study, such that only certain consumers or types of consumers are included in the study. Other inputs, such as inputs related to particular questions to be considered as part of the study, may be considered. For example, if the study is being performed to determine outcomes for different options for a market decision (e.g., different locations for new stores), the different options may be provided as input to be evaluated by the consumer analytics system.

In block 1004, the profiles for multiple consumers for the system are retrieved, each of which indicates characteristics for the consumers. In some cases, all of the profiles for consumers maintained by the consumer analytics platform are retrieved in block 1004, while in other cases, when the request of block 1002 indicates required characteristics for consumers, the profiles of consumers matching those characteristics are retrieved.

In block 1006, the study is performed by the consumer analytics system by reviewing the profiles retrieved in block 1004 and performing a machine learning process on the profiles and characteristics of the profiles. As part of the machine learning algorithm, constraints or inputs provided in block 1002 may be considered and used to guide the machine learning process. As part of the machine learning, relationships between consumers, settings, paths, or other items may be determined. These relationships may be used to determine an output of the machine learning algorithm. As part of the output, in some cases an examination could be performed on the characteristics of groups of consumers included in the algorithms, and this examination may yield inferences and predictions about the consumers with respect to the topic of the study. For example, the inferences may identify current characteristics of the consumers with respect to the topic and the predictions may include potential future characteristics of the consumers with respect to the topic of the study. As another example, inferences or predictions about what consumers may do given one or more conditions or how consumers may react in one or more proposed scenarios may be generated. This information may be described in terms of objectives for a topic of the study, such as sales numbers, numbers of customers, or customer throughput for a business, or other pieces of information that may be relevant to the topic.

A specific example of a study mentioned above is one commissioned by a business that is a restaurant, to determine characteristics of its customers. A current characteristic that can be inferred in block 1006 is that consumers are more likely to visit the restaurant for lunch when on long-duration, general shopping trips than when on a short shopping trip for a particular item. This may be based on an inference regarding detected behaviors of consumers, that the restaurant was most often visited by consumers during paths that were identified to be "general shopping" trips and that were long. A future characteristic that can be predicted in block 1006 is that many consumers will visit the restaurant on a particular holiday weekend. This may be based on a detection that consumers most often engage in general shopping on holiday weekends, as well as that consumers most often visit the restaurant during "general shopping" trips, such that the consumer analytics platform may predict that many consumers will be on general shopping trips on the particular holiday weekend.

Once the inferences and predictions are produced in block 1006, in block 1008 results of the study can be returned to a requestor of the study to be used by the requestor in making market decisions. The results that are returned may include the inferences and predictions produced in block 1006.

Once the results of the study are returned in block 1008, the process 1000 ends.

The process 1000 of FIG. 10 may be used in any of various contexts to aid market researchers in making market decisions. As discussed above, market researchers may perform any suitable query to determine any suitable information about consumers tracked by a consumer analytics platform. Market researchers may also use results of the queries in any suitable manner. In some cases, store siting may be performed based on results of studies, including inferences and predictions. Store siting includes determining for a business good locations to open new stores. Store siting choices may be made based on home and work locations of existing or potential customers, routes traveled by existing or potential customers, and likelihood that potential customers will shop at a potential store location if a store is opened at that location, among other attributes of consumers. Additionally, store siting may be performed based on locations of other stores for organizations that consumers regularly visit and/or regularly visit in connection with visits to existing stores for the business, or on areas that consumers regularly visit. Based on these characteristics of consumers, a prediction may be made that consumers would shop at a store in a proposed location, which may be described in any suitable terms including numbers of customers or numbers of sales. Thus, answers to these questions may be obtained from a consumer analytics platform as described above and used to perform store siting choices.

Similarly, questions regarding advertising effectiveness may be answered using the consumer analytics platform as described above. For example, consumers who have passed by the advertisement, and therefore likely viewed an advertisement, can be identified. Information about consumers who passed by an advertisement can then be queried to determine if the consumers subsequently went to an advertised business or to a business that sells an advertised product. Additionally, for consumers who did visit a business, a determination can be made about whether this deviated from normal behavior for a consumer. If consumers visited businesses associated with an advertisement, then the advertisement may have been effective, particularly if visiting that business deviated from the consumer's normal behavior. Additionally, if the advertisement was determined to be effective for some consumers, predictions can be made about whether the advertisement may be effective for other consumers by identifying other consumers with at least some similar characteristics.

As another example, a study can be performed to determine competitors of a particular business. To do so, characteristics of consumers that visit the particular business can be determined, including behaviors in which the consumers are engaging when they visit those businesses. These characteristics can then be compared to characteristics for other consumers that do not visit the particular business but share many of the same characteristics. This can be done to identify a group of consumers sharing many characteristics, but that visit either the particular visit or visit other businesses. The shared characteristics may include shared identities and preferences as well as shared behaviors. Once these other consumers that share characteristics but visit other businesses have been identified, the other businesses visited by the other consumers may be inferred by the consumer analytics platform to be competitors of the particular business, based on these shared characteristics.

As discussed above in connection with FIG. 9, while not illustrated in the example of FIG. 10, as discussed above in some cases inferences and/or predictions for a study may be determined based on purchase data and/or demographic data, in addition to location data. Embodiments that review purchase data and/or demographic data to make inferences and/or predictions may do so in any suitable manner, including as in the examples described above.

Techniques operating according to principles described herein may be implemented in any suitable manner. For example, the methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The threads may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like. "Storage medium," as used herein, refers to tangible storage media. Tangible storage media are non-transitory and have at least one physical, structural component. In a storage medium, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a network carrying out a protocol for Global System for Mobile Communications (GSM), General Packet Radio Service (GPRS), any third-generation (3G) network, Evolution-Data Optimized (EVDO), ad hoc mesh, Long-Term Evolution (LTE), Worldwide Interoperability for Microwave Access (WiMAX), or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable storage media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another.

The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

Figure 11:
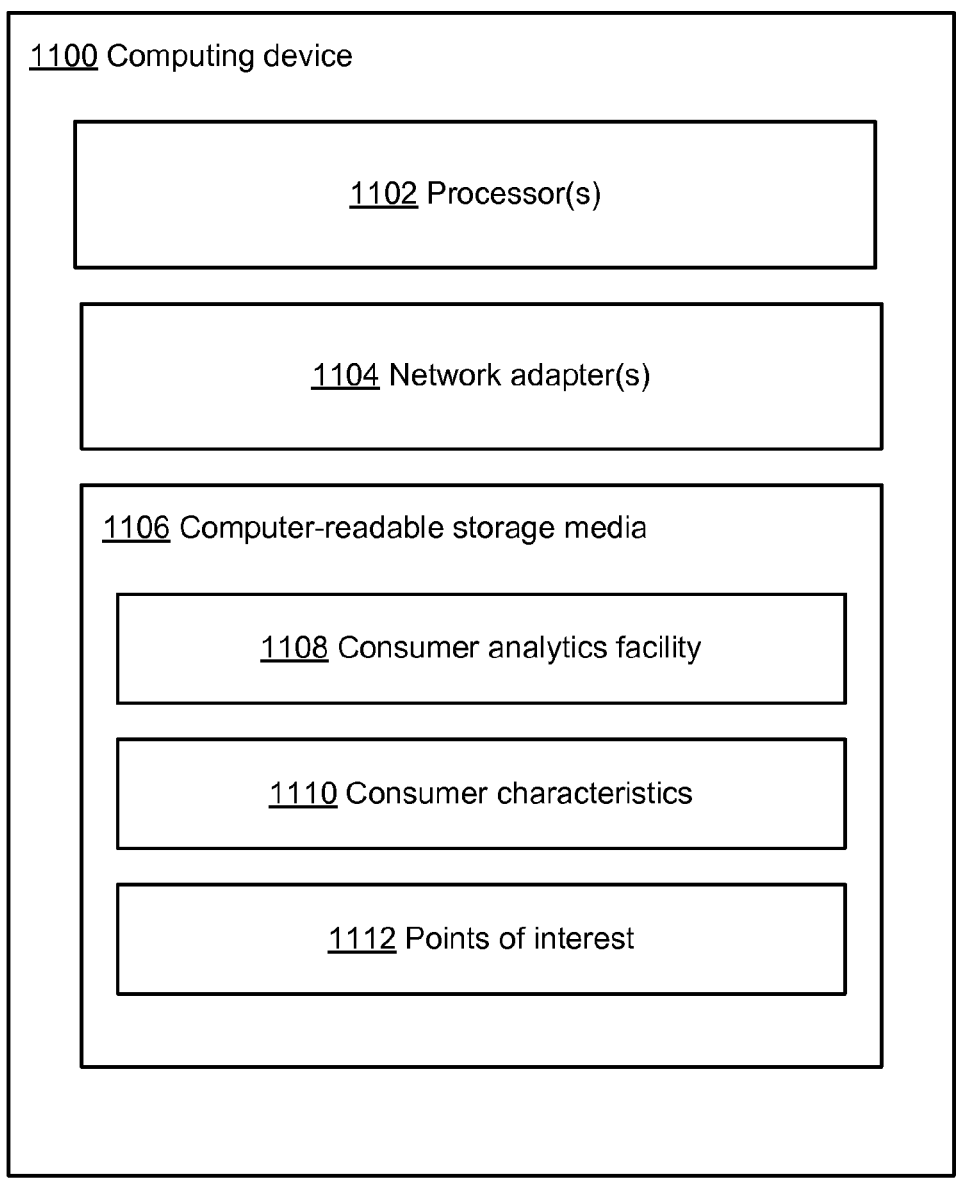
FIG. 11 is a block diagram of one exemplary computing device with which embodiments may operate.

FIG. 11 illustrates one exemplary implementation of a computing device in the form of a computing device 1100 that may be used in a system implementing the techniques described herein, although others are possible. It should be appreciated that FIG. 11 is intended neither to be a depiction of necessary components for a computing device to operate in accordance with the principles described herein, nor a comprehensive depiction.

Computing device 1100 may comprise at least one processor 1102, a network adapter 1104, and computer-readable storage media 1106. Computing device 1100 may be, for example, a desktop or laptop personal computer, a server, a collection of personal computers or servers that operate together, or any other suitable computing device. Network adapter 1104 may be any suitable hardware and/or software to enable the computing device 1100 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1106 may be adapted to store data to be processed and/or instructions to be executed by processor 1102. Processor 1102 enables processing of data and execution of instructions. The data and instructions may be stored on the computer-readable storage media 1106 and may, for example, enable communication between components of the computing device 1100.

The data and instructions stored on computer-readable storage media 1106 may comprise computer-executable instructions implementing techniques which operate according to the principles described herein. In the example of FIG. 11, computer-readable storage media 1106 stores computer-executable instructions implementing various facilities and storing various information as described above. Computer-readable storage media 1106 may store a consumer analytics facility 1108 for obtaining location data for consumers via network adapter 1104 and determining characteristics of the consumers. Consumer analytics facility 1108 may perform any of the exemplary techniques described above, and may include any of the exemplary facilities described above. Computer-readable storage media 1106 may also include data sets to be used by the consumer analytics facility 1108, including a data set 1110 of consumer characteristics, which could include profiles for consumers, and a data set 1112 of points of interests, which could include information about locations and types of points of interest.

While not illustrated in FIG. 11, a computing device may additionally have one or more components and peripherals, including input and output devices. These devices can be used, among other things, to present a user interface.

Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method for controlling mobile devices to obtain data regarding locations of a plurality of consumers, wherein each mobile device of the mobile devices is associated with a consumer of the plurality of consumers, the method comprising, for each of the plurality of consumers, the act:
operating at least one programmed processor to perform a set of acts, the at least one programmed processor being programmed with executable instructions identifying the set of acts, the set of acts comprising:
(A) assigning, for a mobile device associated with a consumer of the plurality of consumers, a time interval between attempts to obtain location data for the consumer;
(B) upon expiration of the time interval:
(i) communicating with the mobile device to obtain location data for a current location of the consumer;
(ii) storing the location data for the current location of the consumer in at least one storage medium, the at least one storage medium storing other location data received for at least one other consumer;
(iii) adjusting the time interval for the mobile device associated with the consumer based at least in part on first information determined based at least in part on the current location of the consumer and second information, wherein adjusting the time interval based at least in part on the first information comprises adjusting the time interval based on a proximity of the consumer to a known setting and one or more current behavior characteristics for the consumer regarding one or more behaviors in which the consumer is engaged at the current location; and
(C) assigning the adjusted time interval to the mobile device associated with the consumer and repeating the act (B)(i) of communicating with the mobile device to obtain new location data for a new current location, the act (B)(ii) of storing, and the act (B)(iii) of adjusting the time interval for the mobile device associated with the consumer.

2. The method of claim 1, wherein obtaining location data comprises obtaining a latitude, longitude, and error margin for the latitude and longitude.

3. The method of claim 1, further comprising:
retrieving the at least one location for the at least one known setting from a data set of information regarding points of interest, wherein each setting of the at least one known setting is a point of interest.

4. The method of claim 1, wherein:
assigning the time interval and adjusting the time interval is based at least in part on a current time;
the second information comprises at least one second behavior characteristic of the consumer determined from analysis of one or more prior visits by the consumer to the current location, the at least one second behavior characteristic indicating whether the consumer regularly relocates when present at the current location at times matching the current time; and
adjusting the time interval based at least in part on the first information and the second information comprises, when the second information indicates that the consumer does not regularly from the current location of the consumer at times matching the current time, increasing the time interval and, when the second information indicates that the consumer regularly relocates from the current location at times matching the current time, decreasing the time interval.

5. The method of claim 1, wherein the act (C) of repeating comprises:
upon expiration of the adjusted time interval, communicating with the mobile device to obtain new location data for a new current location of the consumer;
storing the new location data in the at least one storage medium; and
adjusting the adjusted time interval based at least in part on third information determined based at least in part on the new current location, wherein:
adjusting the time interval based at least in part on the third information comprises adjusting the time interval based on proximity of the consumer to one or more known settings and based at least in part on one or more current behavior characteristics for the consumer regarding one or more behaviors in which the consumer is engaged at the new current location, and
the one or more known settings comprising the known setting.

6. The method of claim 1, wherein:
the second information indicates whether the consumer has previously been detected to have visited the known setting; and
adjusting the time interval based at least in part on the first information and the second information comprises adjusting the time interval based at least in part on whether the consumer has previously been detected to have visited the known setting.

7. The method of claim 1, wherein:
the set of acts further comprises determining, based at least in part on analysis of the location data obtained for the consumer, the one or more current behavior characteristics of the first information;
the second information comprises at least one previously-detected behavior characteristic of the consumer regarding one or more behaviors in which the consumer previously engaged at one or more second locations; and
adjusting the time interval based at least in part on the first information and the second information comprises:
comparing the one or more current behavior characteristics, regarding the one or more behaviors of the consumer, to the at least one previously-detected behavior characteristic of the consumer; and
adjusting the time interval based at least in part on a result of the comparing.

8. The method of claim 1, wherein:
the set of acts further comprises:
    determining, based at least in part on analysis of the location data obtained for the consumer, the one or more current behavior characteristics of the first information; and
    determining the second information at least in part by retrieving, from the at least one storage medium, at least one previously-detected behavior characteristic of the consumer regarding one or more behaviors in which the consumer previously engaged following a time that location data for the consumer was previously detected to have exhibited the one or more current behavior characteristics; and
adjusting the time interval based at least in part on the first information and the second information comprises adjusting the time interval based at least in part on the at least one previously-detected behavior characteristic.

9. The method of claim 1, wherein:
the set of acts further comprises:
    determining, based at least in part on analysis of the location data obtained for the consumer, the one or more current behavior characteristics of the first information; and
    determining the second information at least in part by determining, from an analysis of at least one previously-detected behavior characteristic of the consumer determined from one or more second locations, whether the consumer may engage in a different behavior during a time period following the communicating to obtain; and
adjusting the time interval based at least in part on the first information and the second information comprises adjusting the time interval based at least in part on whether the second information indicates that the consumer may engage in a different behavior during the time period.

10. The method of claim 1, wherein:
the second information comprises one or more settings that the consumer has been detected to have previously visited; and
adjusting the time interval based at least in part on the first information and the second information comprises selecting the known setting, from a plurality of settings, based at least in part on the one or more settings that the consumer is detected to have previously visited.

11. The method of claim 10, wherein:
selecting the known setting comprises selecting a setting associated with a competitor of a business included in the one or more settings; and
adjusting the time interval based on the proximity of the consumer to the known setting comprises adjusting the time interval based on the proximity of the consumer to the setting associated with the competitor.

12. The method of claim 11, wherein the set of acts further comprises, following the repeating:
analyzing location data indicating current locations of the consumer for a time period following a time at which the consumer was detected to be proximate to the setting associated with the competitor to determine whether the consumer visited the setting associated with the competitor or passed by the setting associated with the competitor.

13. The method of claim 10, wherein:
selecting the known setting comprises selecting a setting that has been determined, based on the one or more second locations of the second information, to be a personally-relevant location for the consumer; and
adjusting the time interval based on the proximity of the consumer to the known setting comprises adjusting the time interval based on the proximity of the consumer to the personally-relevant location for the consumer.

14. The method of claim 10, wherein:
selecting the known setting comprises selecting a setting that has been determined, based on the one or more second locations of the second information, to be a setting that the consumer is likely to visit; and
adjusting the time interval based on the proximity of the consumer to the known setting comprises adjusting the time interval based on the proximity of the consumer to the setting that the consumer has been determined to be likely to visit.

15. The method of claim 1, wherein the set of acts further comprises determining the second information based at least in part on one or more second locations at which the at least one other consumer was present at one or more other times.

16. The method of claim 15, wherein:
the at least one other consumer comprises other consumers of a group of consumers, wherein the consumer is a member of the group of consumers;
the second information comprises at least one group behavior characteristic determined for the group of consumers based at least in part on an analysis of the one or more second locations at which the consumers of the group were present; and
adjusting the time interval based at least in part on the second information comprises adjusting the time interval based at least in part on the at least one group behavior characteristic.

17. The method of claim 16, wherein adjusting the time interval based at least in part on the one or more current behavior characteristics and on the at least one group behavior characteristic comprises:
comparing the one or more current behavior characteristics to the at least one group behavior characteristic; and
adjusting the time interval based at least in part on a result of the comparing.

18. The method of claim 1, wherein the set of acts further comprises:
analyzing location data for the consumer, indicating locations at which the consumer was present over time, that is stored in the at least one storage medium, to identify from the locations a plurality of paths taken by the consumer, wherein each path is a collection of one or more settings visited by a consumer together in a group;
analyzing the plurality of paths to identify one or more patterns of behavior of the consumer in taking the plurality of paths over a period of time; and
inferring at least one characteristic of the consumer from the one or more patterns of behavior.

19. The method of claim 18, wherein analyzing the location data to identify the plurality of paths comprises analyzing the location data to identify a plurality of paths, each path comprising at least two settings visited by the consumer in the path, wherein the at least two settings for a path comprise a starting endpoint for the path and an ending endpoint for the path and the starting endpoint for each path and the ending endpoint for each path are personally-relevant locations for the consumer.

20. The method of claim 18, wherein analyzing the plurality of paths to identify one or more patterns of behavior comprises identifying a frequency with which the consumer takes a path including a particular set of settings.

21. The method of claim 18, wherein:
the set of acts further comprises:
determining, based at least in part on analysis of the location data obtained for the consumer, the one or more current behavior characteristics of the first information;
determining the second information at least in part by retrieving, from the at least one storage medium, the one or more patterns in behavior for the consumer and determining a potential pattern of behavior that the one or more current behavior characteristics match; and
adjusting the time interval based at least in part on the first information and the second information comprises:
selecting the known setting by determining a setting for which a visit by the consumer would be consistent with the potential pattern of behavior; and
adjusting the time interval based on proximity to the known setting selected in the selecting.

22. The method of claim 21, wherein the set of acts further comprises determining whether the consumer deviated from the potential pattern of behavior.

23. The method of claim 18, wherein analyzing the location data to identify the plurality of paths comprises analyzing the location data to identify, for a first path of the plurality of paths, a sequence of settings visited in the path.

24. The method of claim 18, wherein analyzing the plurality of paths to identify the one or more patterns of behavior of the consumer in taking the plurality of paths over the period of time comprises identifying a pattern in two or more types of settings visited together in paths of the plurality of paths.

25. The method of claim 1, wherein:
assigning the time interval for the mobile device comprises transmitting to the mobile device associated with the consumer at least one first message indicating the time interval;
communicating with the mobile device to obtain the location data comprises receiving from the mobile device associated with the consumer at least one second message indicating the location data; and
assigning the adjusted time interval to the mobile device comprises transmitting to the mobile device at least one third message indicating the adjusted time interval.

26. The method of claim 25, wherein:
transmitting the at least one first message indicating the time interval comprises transmitting at least one first message including the time interval; and
transmitting the at least one third message indicating the adjusted time interval comprises transmitting at least one third message including the adjusted time interval.

27. The method of claim 1, wherein communicating with the mobile device to obtain the location data comprises receiving from the mobile device associated with the consumer at least one second message indicating the location data, wherein the location data was generated by the mobile device associated with the consumer.

28. The method of claim 1, wherein:
assigning the time interval comprises communicating to the mobile device the time interval;
communicating with the mobile device to obtain the location data comprises receiving the location data transmitted by the mobile device at the time interval;
assigning the adjusted time interval comprises communicating to the mobile device the adjusted time interval; and
communicating with the mobile device to obtain the new location data comprises receiving the new location data transmitted by the mobile device at the adjusted time interval.

29. The method of claim 1, further comprising:
with the mobile device, transmitting the location data in response to detecting expiration of the time interval; and
with the mobile device, transmitting the new location data in response to detecting expiration of the adjusted time interval.

30. The method of claim 1, wherein:
communicating with the mobile device to obtain the location data comprises, at the time interval, requesting that the mobile device transmit the location data and receiving the location data in response to the requesting; and
communicating with the mobile device to obtain the new location data comprises, at the adjusted time interval, requesting that the mobile device transmit the new location data and receiving the new location data in response to the requesting.

31. At least one non-transitory computer-readable storage medium having encoded thereon executable instructions that, when executed by at least one computer, cause the at least one computer to carry out a method for controlling a mobile device to obtain data regarding locations of a consumer of a plurality of consumers, wherein the mobile device is associated with the consumer, the method comprising:
(A) assigning, for the mobile device associated with the consumer, a time interval between attempts to obtain location data for the consumer;
(B) upon expiration of the time interval:
(i) communicating with the mobile device to obtain location data for a current location of the consumer;
(ii) storing the location data for the current location of the consumer in at least one storage medium storing other location data received for at least one other consumer;
(iii) adjusting the time interval for the mobile device associated with the consumer based at least in part on first information determined based at least in part on the current location of the consumer and second information, wherein adjusting the time interval based at least in part on the first information comprises adjusting the time interval based on a proximity of the consumer to a known setting and one or more current behavior characteristics for the consumer regarding one or more behaviors in which the consumer is engaged at the current location; and
(C) assigning the adjusted time interval to the mobile device associated with the consumer and repeating the act (B)(i) of communicating with the mobile device to obtain new location data for a new current location, the act (B)(ii) of storing, and the act (B)(iii) of adjusting the time interval for the mobile device associated with the consumer.

32. The at least one non-transitory computer-readable storage medium of claim 31, wherein:
assigning the time interval and adjusting the time interval is based at least in part on a current time,
the second information comprises at least one second behavior characteristic of the consumer determined from analysis of one or more prior visits by the consumer to the current location, the at least one second behavior characteristic indicating a frequency with which the consumer relocates when present at the current location at times matching the current time; and
adjusting the time interval based at least in part on the first information and the second information comprises:
when the second information indicates that the frequency with which the consumer relocates from the location of the known setting at times matching the current time is below a threshold, increasing the time interval, and
when the second information indicates that the frequency with which the consumer relocates from the location of the known setting at times matching the current time is above the threshold, decreasing the time interval.

33. The at least one non-transitory computer-readable storage medium of claim 31, wherein:
the second information indicates whether the consumer has previously been detected to have visited the known setting; and
adjusting the time interval based at least in part on the first information and the second information comprises adjusting the time interval based at least in part on whether the second information indicates that the consumer has previously been detected to have visited the known setting.

34. The at least one non-transitory computer-readable storage medium of claim 31, wherein:
the method further comprises determining, based at least in part on analysis of the location data obtained for the consumer, the one or more current behavior characteristics of the first information;
the second information comprises at least one previously-detected behavior characteristic of the consumer regarding one or more behaviors in which the consumer previously engaged at one or more second locations; and
adjusting the time interval based at least in part on the first information and the second information comprises:
comparing the one or more current behavior characteristics, regarding the one or more behaviors of the consumer, to the at least one previously-detected behavior of the consumer; and
adjusting the time interval based at least in part on a result of the comparing.

35. The at least one non-transitory computer-readable storage medium of claim 31, wherein:
the method further comprises:
determining, based at least in part on analysis of the location data obtained for the consumer, the one or more current behavior characteristics of the first information; and
determining the second information at least in part by retrieving, from the at least one storage medium, at least one previously-detected behavior characteristic of the consumer regarding one or more behaviors in which the consumer previously engaged following a time that location data for the consumer was previously detected to have exhibited the one or more current behavior characteristics; and
adjusting the time interval based at least in part on the first information and the second information comprises adjusting the time interval based at least in part on the at least one previously-detected behavior characteristic.

36. The at least one non-transitory computer-readable storage medium of claim 31, wherein:
the method further comprises:
determining, based at least in part on analysis of the location data obtained for the consumer, the one or more current behavior characteristics of the first information; and
determining the second information at least in part by determining, from an analysis of at least one previously-detected behavior characteristic of the consumer determined from one or more second locations, whether the consumer may engage in a different behavior during a time period following the communicating to obtain; and
adjusting the time interval based at least in part on the first information and the second information comprises adjusting the time interval based at least in part on whether the second information indicates that the consumer may engage in a different behavior during the time period.

37. An apparatus comprising:
at least one processor; and
at least one non-transitory computer-readable storage medium having encoded thereon executable instructions that, when executed by the at least one processor, cause the at least one processor to carry out a method for controlling a mobile device to obtain data regarding locations of a consumer of a plurality of a plurality of consumers, wherein the mobile device is associated with the consumer, the method comprising:
(A) assigning, for the mobile device associated with the consumer, a time interval between attempts to obtain location data for the consumer;
(B) upon expiration of the time interval:
(i) communicating with the mobile device to obtain location data for a current location of the consumer;
(ii) storing the location data for the current location of the consumer in at least one storage medium storing other location data received for at least one other consumer;
(iii) adjusting the time interval for the mobile device associated with the consumer based at least in part on first information determined based at least in part on the current location of the consumer and second information, wherein adjusting the time interval based at least in part on the first information comprises adjusting the time interval based on a proximity of the consumer to a known setting and one or more current behavior characteristics for the consumer regarding one or more behaviors in which the consumer is engaged at the current location; and
(C) assigning the adjusted time interval to the mobile device associated with the consumer and repeating the act (B)(i) of communicating with the mobile device to obtain new location data for a new current location, the act (B)(ii) of storing, and the act (B)(iii) of adjusting the time interval for the mobile device associated with the consumer.

38. The apparatus of claim 37, wherein:
assigning the time interval and adjusting the time interval is based at least in part on a current time,
the second information comprises at least one second behavior characteristic of the consumer determined from analysis of one or more prior visits by the consumer to the current location, the at least one second behavior characteristic indicating a frequency with which the consumer relocates when present at the current location at times matching the current time; and adjusting the time interval based at least in part on the first information and the second information comprises:
   when the second information indicates that the frequency with which the consumer relocates from the location of the known setting at times matching the current time is below a threshold, increasing the time interval, and
   when the second information indicates that the frequency with which the consumer relocates from the location of the known setting at times matching the current time is above the threshold, decreasing the time interval.

39. The apparatus of claim 37, wherein:
the second information indicates whether the consumer has previously been detected to have visited the known setting; and
adjusting the time interval based at least in part on the first information and the second information comprises adjusting the time interval based at least in part on whether the second information indicates that the consumer has previously been detected to have visited the known setting.

40. The apparatus of claim 37, wherein:
the method further comprises determining, based at least in part on analysis of the location data obtained for the consumer, the one or more current behavior characteristics of the first information;
the second information comprises at least one previously-detected behavior characteristic of the consumer regarding one or more behaviors in which the consumer previously engaged at one or more second locations; and
adjusting the time interval based at least in part on the first information and the second information comprises:
   comparing the one or more current behavior characteristics, regarding the one or more behaviors of the consumer, to the at least one previously-detected behavior of the consumer; and
   adjusting the time interval based at least in part on a result of the comparing.

41. The apparatus of claim 37, wherein:
the method further comprises:
   determining, based at least in part on analysis of the location data obtained for the consumer, the one or more current behavior characteristics of the first information; and
   determining the second information at least in part by retrieving, from the at least one storage medium, at least one previously-detected behavior characteristic of the consumer regarding one or more behaviors in which the consumer previously engaged following a time that location data for the consumer was previously detected to have exhibited the one or more current behavior characteristics; and
adjusting the time interval based at least in part on the first information and the second information comprises adjusting the time interval based at least in part on the at least one previously-detected behavior characteristic.

42. The apparatus of claim 37, wherein:
the method further comprises:
   determining, based at least in part on analysis of the location data obtained for the consumer, the one or more current behavior characteristics of the first information; and
   determining the second information at least in part by determining, from an analysis of at least one previously-detected behavior characteristic of the consumer determined from one or more second locations, whether the consumer may engage in a different behavior during a time period following the communicating to obtain; and
adjusting the time interval based at least in part on the first information and the second information comprises adjusting the time interval based at least in part on whether the second information indicates that the consumer may engage in a different behavior during the time period.

* * * * *